US00RE47587E

(19) United States
(12) Reissued Patent
Kato et al.

(10) Patent Number: US RE47,587 E
(45) Date of Reissued Patent: Aug. 27, 2019

(54) RADIO COMMUNICATION SYSTEM, BASE STATION DEVICE AND MOBILE STATION DEVICE UTILIZING AN INTERMITTENT RECEPTION

(71) Applicant: SHARP KABUSHIKI KAISHA, Osaka-shi (JP)

(72) Inventors: Yasuyuki Kato, Osaka (JP); Shohei Yamada, Osaka (JP); Wahoh Oh, Osaka (JP)

(73) Assignee: SHARP KABUSHIKI KAISHA, Sakai, Osaka (JP)

(21) Appl. No.: 15/141,422

(22) Filed: Apr. 28, 2016

Related U.S. Patent Documents

Reissue of:
(64) Patent No.: 8,711,879
Issued: Apr. 29, 2014
Appl. No.: 12/444,116
PCT Filed: Sep. 27, 2007
PCT No.: PCT/JP2007/068785
§ 371 (c)(1),
(2) Date: Apr. 2, 2009
PCT Pub. No.: WO2008/050574
PCT Pub. Date: May 2, 2008

(30) Foreign Application Priority Data

Oct. 23, 2006 (JP) ..... 2006-287680

(51) Int. Cl.
*H04L 12/28* (2006.01)
*H04J 3/22* (2006.01)
(Continued)

(52) U.S. Cl.
CPC ..... *H04W 72/1231* (2013.01); *H04L 1/0026* (2013.01); *H04L 1/0027* (2013.01);
(Continued)

(58) Field of Classification Search
CPC ..... H04L 1/0026; H04L 1/0027; H04W 72/1231; H04W 52/0216; H04W 76/28;
(Continued)

(56) References Cited

U.S. PATENT DOCUMENTS 7,948,958 B2 * 5/2011 Vimpari et al. ..... 370/342
2002/0064140 A1 * 5/2002 Numminen ..... 370/311
(Continued)

FOREIGN PATENT DOCUMENTS

JP 2003-229811 A 8/2003
JP 2003-259454 A 9/2003
(Continued)

OTHER PUBLICATIONS

Ericsson: "DRX and DTX in LTE Active", 3GPP DRAFT; R2-060967, 3rd Generation Partnership Project (3GPP), Athens, Greece, Mar. 27-31, 2006; XP050130896, [retrieved on Mar. 23, 2006] *paragraphs 3.1, 3.2, 3.3, 4.1, 6*.
(Continued)

*Primary Examiner* — Mark Sager
(74) *Attorney, Agent, or Firm* — Birch, Stewart, Kolasch & Birch, LLP

(57) ABSTRACT

With communication service considered, it is an object to provide a communication system in which power consumption of a mobile station device is suppressed. This mobile communication system includes a base station device and a mobile station device, wherein the base station device includes a scheduling portion that carries out scheduling to determine a downlink CQI effective period scheduled by using the downlink CQI as a downlink effective period, start the downlink effective period after a lapse of a given period from downlink CQI transmission timing, and allow the mobile station device to transmit control information and user data only during the downlink effective period.

20 Claims, 20 Drawing Sheets

(51) Int. Cl.

| | |
|---|---|
| ***H04J 3/16*** | (2006.01) |
| ***H04J 1/16*** | (2006.01) |
| ***H04J 3/00*** | (2006.01) |
| ***H04L 12/26*** | (2006.01) |
| ***H04J 3/14*** | (2006.01) |
| ***H04B 7/212*** | (2006.01) |
| ***H04W 72/12*** | (2009.01) |
| ***H04L 1/00*** | (2006.01) |
| *H04W 52/02* | (2009.01) |
| *H04W 76/28* | (2018.01) |

(52) U.S. Cl.
CPC ..... *H04W 52/0216* (2013.01); *H04W 76/28* (2018.02); *Y02D 70/1244* (2018.01); *Y02D 70/1262* (2018.01); *Y02D 70/23* (2018.01); *Y02D 70/24* (2018.01); *Y02D 70/25* (2018.01)

(58) Field of Classification Search
CPC ..... Y02D 70/00; Y02D 70/1262; Y02D 70/1222; Y02D 70/24; Y02D 70/23; Y02D 70/1244; Y02D 70/25
USPC ..... 370/468, 336, 230.1, 395.4, 347, 231, 370/328, 235, 395.41, 236, 395.42, 348, 370/345, 230, 329, 395.43
See application file for complete search history.

(56) References Cited

U.S. PATENT DOCUMENTS

| | | | | |
|---|---|---|---|---|
| 2003/0169707 | A1 | 9/2003 | Usuda et al. | |
| 2005/0009527 | A1* | 1/2005 | Sharma | 455/445 |
| 2005/0073976 | A1 | 4/2005 | Fujii | |
| 2006/0126531 | A1 | 6/2006 | Myojo et al. | |
| 2007/0291728 | A1* | 12/2007 | Dalsgaard et al. | 370/347 |

FOREIGN PATENT DOCUMENTS

| | | | |
|---|---|---|---|
| JP | 2004-104465 | A | 4/2004 |
| JP | 2004-135180 | A | 4/2004 |
| JP | 2005-110130 | A | 4/2005 |
| JP | 2006/173678 | A | 6/2006 |
| JP | 2006-279635 | A | 10/2006 |

OTHER PUBLICATIONS

"Physical Channels and Multiplexing in Evolved UTRA Downlink", 3GPP TSG RAN WG1 #42 on LTE, R1-050707, London, UK, Aug. 29-Sep. 2, 2005, pp. 1-15.

"Physical Channels and Multiplexing in Evolved UTRA Uplink", 3GPP TSG RAM WG1 #42 on LTE, R1-050850, London, UK, Aug. 29-Sep. 2, 2005, pp. 1-14.

"3rd Generation Partnership Project; Technical Specification Group Radio Access Network; Requirements for Evolved UTRA and UTRAN", 3GPP TR 25.913 V2.1.0 May 2005), pp. 1-14.

DRX and DTX Operation in LTE_Active, 3GPP TSG-RAN WG2 Meeting #52, R2-061061, Athena, Greece, Mar. 2006, pp. 1-3.

"Active Mode DRX", 3GPP TSG-RAN WG2 Meeting #55, R2-062752, Seoul, Korea, Oct. 9-13, 2006, pp. 1-3.

* cited by examiner (1) DOWNLINK PILOT (2) UPLINK SCHEDULING INFORMATION (3) USER DATA (4) Ack/Nack
(5) UPLINK PILOT (6) DOWNLINK CQI (7) UPLINK TRANSMISSION REQUEST (8) USER DATA (9) Ack/Nack (1) DOWNLINK PILOT (2) UPLINK SCHEDULING INFORMATION (3) USER DATA (4) Ack/Nack
(5) UPLINK PILOT (6) DOWNLINK CQI (7) UPLINK TRANSMISSION REQUEST (8) USER DATA (9) Ack/Nack

FIG. 13

(A)

| No | PRIORITY | Service | USC | UAP | DCFC |
|---|---|---|---|---|---|
| 1 | 1 | Real−time (DATA LARGE IN VOLUME) | 5 | 5 | 5 |
| 2 | 2 | Real−time (DATA SMALL IN VOLUME) | 10 | 5 | 10 |
| 3 | 3 | Non−real−time (DATA LARGE IN VOLUME) | 20 | 5 | 20 |
| 4 | 4 | Non−real−time (DATA SMALL IN VOLUME) | 40 | 5 | 40 |
| 5 | 5 | Low CQI | 40 | 5 | 40 |
| 6 | 6 | No Packet | 80 | 5 | 80 |

(B)

| No | PRIORITY | Service | DSC | DAP |
|---|---|---|---|---|
| 1 | 1 | Real−time (DATA LARGE IN VOLUME) | 5 | 5 |
| 2 | 2 | Real−time (DATA SMALL IN VOLUME) | 10 | 5 |
| 3 | 3 | Non−real−time (DATA LARGE IN VOLUME) | 20 | 5 |
| 4 | 4 | Non−real−time (DATA SMALL IN VOLUME) | 40 | 5 |
| 5 | 5 | Low CQI | 40 | 5 |
| 6 | 6 | No Packet | 80 | 5 |

(1) DOWNLINK PILOT (2) UPLINK SCHEDULING INFORMATION (3) USER DATA (4) Ack/Nack
(5) UPLINK PILOT (6) DOWNLINK CQI (7) UPLINK TRANSMISSION REQUEST (8) USER DATA (9) Ack/Nack

RADIO COMMUNICATION SYSTEM, BASE STATION DEVICE AND MOBILE STATION DEVICE UTILIZING AN INTERMITTENT RECEPTION

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS REFERENCE TO RELATED APPLICATIONS*

*This application is a Reissue of U.S. application Ser. No. 12/444,116, filed Apr. 2, 2009, now U.S. Pat. No. 8,711,879, the entire contents of which are incorporated herein by reference.*

TECHNICAL FIELD

The present invention relates to a radio communication system, a base station device, and a mobile station device, and, more particularly, to a packet data communication method having an adaptive modulation/demodulation error correcting method based on adaptive radio link control as an EUTRA technique in the mobile communication system.

BACKGROUND OF THE INVENTION

3GPP (Third Generation Partnership Project) has established the W-CDMA method as a standard third generation cellular mobile communication method, and a series of W-CDMA-based services are now started. HSDPA (High-Speed Downlink Packet Access) with higher communication speed has also been established as a standardized access method, and HSDPA-base service is now about to begin.

Meanwhile, an evolved form of the third generation radio access (Evolved Universal Terrestrial Radio Access hereinafter referred to as "EUTRA") has been discussed in the 3GPP.

An OFDM (Orthogonal Frequency Division Multiplexing) method is suggested for application to a downlink in EUTRA.

An adaptive modulation/demodulation error correcting method (AMCS: Adaptive Modulation and Coding Scheme hereinafter referred to as "AMCS method") based on adaptive radio link control (link adaptation) of channel coding, etc., is applied as an EUTRA technique to the OFDM method.

The AMCS method is the method of changing a radio transmission parameter (hereinafter "AMC mode"), such as error correcting method, coding factor in error correction, data modulation multivalue number, code spreading factor (SF) along the time/frequency axes, and multicode multiplexing number, depending on a propagation path condition at each mobile station to efficiently carry out high-speed packet data transmission.

For example, in data modulation, QPSK (Quadrature Phase Shift Keying) is changed to more efficient multivalue modulation, such as 8PSK and 16QAM (Quadrature Amplitude Modulation), as a propagation path condition improves. This increases the maximum throughput of a communication system.

Various communication methods, such as a multicarrier communication method and a single-carrier communication method, are suggested for application to an uplink in EUTRA. In suggested methods, the single-carrier communication method superior in PAPR (Peak to Average Power Ratio) characteristics is preferred to the multicarrier communication method, such as OFDM method.

FIG. 18 depicts a channel configuration of an uplink and a downlink that is assumed based on a suggestion from the 3GPP for EUTRA.

The downlink in EUTRA is composed of a downlink pilot channel DPiCH, a downlink synchronization channel DSCH, a downlink common control channel DCCCH, a downlink shared control signaling channel DSCSCH, and a downlink shared data channel DSDCH (Nonpatent Literature 1).

The uplink in EUTRA is composed of an uplink pilot channel UPiCH, a contention-based channel CBCH, and an uplink scheduling channel USCH (Nonpatent Literature 2).

In the downlink in EUTRA, the downlink pilot channel DPiCH includes a downlink common pilot channel DCPiCH and a downlink dedicated pilot channel DDPiCH.

The downlink common pilot channel DCPiCH is equivalent to a common pilot channel CPiCH in the W-CDMA method, and is used for estimation of radio propagation path characteristics, cell search, and measurement of propagation path loss in uplink transmission power control in executing the AMCS method.

The downlink dedicated pilot channel DDPiCH is transmitted from an antenna different from a cell shared antenna in radio propagation path characteristics, such as adaptive array antenna, to a dedicated mobile station device, or, when necessary, may be used for reinforcing the downlink common pilot channel DCPiCH in transmission to a mobile station device with a low reception quality.

The downlink synchronization channel DSCH is equivalent to a synchronization channel SCH in the W-CDMA method, and is used for cell search by a mobile station device, a radio frame for an OFDM signal, a time slot, a TTI (Transmission Time Interval), and OFDM symbol timing synchronization.

The downlink common control channel DCCCH is equivalent to a primary common control physical channel P-CCPCH, a secondary common control physical channel S-CCPCH, and a paging indicator channel PICH in the W-CDMA method, containing common control information, such as report information, paging indicator PI information, paging information, and downlink access information.

The downlink shared control signaling channel DSCSCH is equivalent to a control information channel of a high-speed physical downlink shared channel HS-PDSCH in the HSDPA method. The downlink shared control signaling channel DSCSCH is shared by a plurality of mobile station devices, and is used for transmitting information (modulation method, spreading code, etc.) necessary for demodulation in a high-speed downlink shared channel HS-DSCH, information necessary for an error correction/decoding process and an HARQ (Hybrid Automatic Repeat Request) process, radio resources (frequency, time) scheduling information, etc., to each mobile station device.

The downlink shared data channel DSDCH is equivalent to a packet data channel of the high-speed physical downlink shared channel HS-PDSCH in the HSDPA method, and is used for transmitting packet data from a superior layer to a mobile station device.

In the uplink, the contention-based channel CBCH is equivalent to a random access channel RACH in the W-CDMA method.

The uplink scheduling channel USCH is composed of a shared control channel SCCH and a shared data channel SDCH, which are equivalent to an uplink dedicated physical data channel UDPDCH in the W-CDMA method and an uplink dedicated physical control channel for HS-DSCH (HS-UDPCCH) in the HSDPA method. The uplink scheduling channel USCH is shared by each mobile station device, and is used by the mobile station device to transmit packet data, downlink channel propagation path quality information CQI (Channel Quality Indicator), feedback information of HARQ, etc., an uplink pilot, and uplink channel control information.

The uplink pilot channel UPiCH is used for estimating uplink radio propagation path characteristics in the AMCS method.

FIG. 19 depicts a configuration of a downlink radio frame that is assumed based on a suggestion from the 3GPP for EUTRA.

A downlink radio frame has a two-dimensional configuration composed of Chunks that are groups of a plurality of subcarriers along the frequency axis, and time slots TTIs along the time axis. A Chunk consists of a group of subcarriers.

For example, when the spectrum BW of the whole downlink (downlink frequency bandwidth) is 20 MHz and the frequency bandwidth Bch of a Chunk is 1.25 MHz, the downlink radio frame contains 16 Chunks along the frequency axis.

When one radio frame is 10 ms and a TTI is 0.5 ms, one radio frame contains 20 TTIs along the time axis. One radio frame, therefore, contains 16 Chunks and 20 TTIs, and one TTI contains a plurality of OFDM symbol lengths (Ts).

Hence, in the case of FIG. 19, the minimum radio resources unit available to a mobile station device is made up of one Chunk and one TTI (0.5 ms).

Radio resources of one Chunk can be subdivided further.

As shown in FIG. 19, the downlink common pilot channel DCPiCH is mapped to be located at the head of each TTI. The downlink dedicated pilot channel DDPiCH is mapped to be located at a proper position in one TTI when necessary, according to an antenna use condition at the base station or a propagation path condition at a mobile station device (e.g., located at the center of TTI).

The downlink common control channel DCCCH and the downlink synchronization channel DSCH are mapped to be located at the head TTI of the radio frame. As a result of locating both channels at the head TTI of the radio frame, a mobile station device in an idle mode can receive common control information of cell search, timing synchronization, report information, paging information, etc., by receiving only the head TTI of the radio frame or several OFDM symbol lengths (Ts) in the head TTI of the radio frame. When in the idle mode, the mobile station device is allowed to carry out intermittent reception (IR) operation.

The downlink shared control signaling channel DSCSCH is mapped to be located at the head of each TTI, as the downlink common pilot channel DCPiCH is. This allows a mobile station device to carry out intermittent reception to receive only the downlink shared control signaling channel DSCSCH when the mobile station device is on packet communication but packet data addressed to the mobile station device is not present in each TTI.

The downlink shared data channel DSDCH is divided in Chunks, transmitting packet data addressed to each mobile station device based on the AMCS method. Each Chunk is assigned to each user (e.g., each of mobile station devices MS1, MS2, and MS3 shown in FIG. 19) according to a propagation path condition at each mobile station device.

A user scheduling method is suggested to improve the throughput of the entire system, by which method, as shown in FIG. 19, one Chunk is assigned as a unit Chunk to one user but Chunks more than one Chunk are assigned to a user of a mobile station device having better radio propagation path characteristics in time slots TTI_1 and TTI_2 to create a multiuser diversity effect. Another user scheduling method is also suggested to improve reception characteristics, by which method, as shown in FIG. 19, a plurality of Chunks and sub-TTIs are assigned as unit Chunks and TTIs to a plurality of users in time slots TTI_3, TTI_n−1, and TTI_n, in which a wider frequency bandwidth across a plurality of Chunks is given to a user of a mobile station device whose radio propagation path characteristics are inferior due to cell boundaries, high-speed movement, etc., to create a frequency diversity effect.

FIG. 20 depicts a configuration of an uplink radio frame that is assumed based on a suggestion from the 3GPP for EUTRA.

An uplink radio frame has a two-dimensional configuration composed of Chunks that are groups of a plurality of subcarriers along the frequency axis, and time slots TTIs along the time axis. A Chunk consists of a group of subcarriers. For example, when the spectrum BW of the whole uplink (uplink frequency bandwidth) is 20 MHz and the frequency bandwidth Bch of a Chunk is 1.25 MHz, the uplink radio frame contains 16 Chunks along the uplink frequency axis.

When one radio frame is 10 ms and a TTI is 0.5 ms, one radio frame contains 20 TTIs along the time axis. One radio frame, therefore, contains 16 Chunks and 20 TTIs, and one TTI contains a plurality of symbol lengths.

Hence, in the case of FIG. 20, the minimum radio resources unit available to a mobile station device is made up of one Chunk (1.25 MHz) and one TTI (0.5 ms).

Radio resources of one Chunk can be subdivided further.

As shown in FIG. 20, the uplink pilot channel UPiCH is mapped to be located at the head and the tail of each TTI of the uplink scheduling channel USCH.

The base station device estimates a radio propagation path and detects the synchronization between a mobile station device and the base station device from the uplink pilot channel UPiCH of each mobile station device.

Mobile station devices are allowed to simultaneously transmit the uplink pilot channels UPiCH using toothcomb-shaped spectrum (distributed FDMA), localized spectrum (localized FDMA), or CDMA.

The contention-based channel CBCH is divided in Chunks. When user data or control data not scheduled by the base station device is present, such data can be transmitted through the contention-based channel CBCH.

The uplink scheduling channel USCH is divided in Chunks. Each mobile station device subjected to scheduling by the base station device transmits packet data through the uplink scheduling channel USCH to the base station device, based on the AMCS method.

Each Chunk is assigned to each user (e.g., each of mobile station devices MS1, MS2, MS3, MS4, and MS5 shown in FIG. 20) according to a radio propagation path condition at each mobile station device.

A request item of EUTRA states a need of considering power consumption by a mobile station device (Nonpatent Literature 3).

Nonpatent Literature 4 presents a suggestion of controlling a period of transmitting/receiving control information and user data and a period of not transmitting/receiving control information and user data to suppress power consumption.

Nonpatent Literature 1: R1-050707 "Physical Channels and Multiplexing in Evolved UTRA Downlink", 3GPP TSG RAN WG1 Metting #42 London, UK, Aug. 29-Sep. 2, 2005

Nonpatent Literature 2: R1-050850 "Physical Channels and Multiplexing in Evolved UTRA Uplink", 3GPP TSG RAN WG1 Metting #42 London, UK, Aug. 29-Sep. 2, 2005

Nonpatent Literature 3: 3GPP TR (Technical Report) 25.913, V2.1.0 (2005-05), Requirements for Evolved Universal Terrestrial Radio Access (UTRA) and Universal Terrestrial Radio Access Network (UTRAN)

Nonpatent Literature 4: R2-061061 "DRX and DTX Operation in LTE_Active", 3GPP TSG RAN WG2 Metting #52 Athena, Greece, Mar. 27-31, 2006

DISCLOSURE OF THE INVENTION

Problem to be Solved by the Invention

Nonpatent Literature 4 presents the suggestion of controlling the period of transmitting/receiving control information and user data and the period of not transmitting/receiving control information and user data to suppress power consumption, but does not present more specific suggestion.

The present invention was conceived in view of the above circumstances, and it is therefore the object to provide a radio communication system, a base station device, and a mobile station device that suppress power consumption of a mobile station device while considering communication service in executing a packet data communication method including an adaptive modulation/demodulation error correcting method based on adaptive radio link control as an EUTRA technique.

Means for Solving the Problems

In order to solve the above problem, the base station device and the mobile station device of the present invention are configured in the following manner.

The base station device sets an interval between periods enabling the mobile station device to receive a downlink control channel containing radio resources scheduling information, and transmits the interval included in an RRC message to the mobile station device.

The mobile station device includes a radio portion that receives the RRC message, and a DRX control portion that determines an interval of execution of a reception process on the downlink control channel containing radio resources scheduling information, based on the RRC message.

The mobile station device may include a DRX control portion that determines an interval of execution of the reception process on the downlink control channel containing radio resources scheduling information, based on a time to take from transmission of an uplink data channel to reception of a response to the uplink data channel that is transmitted from the base station device.

The mobile station device measures the reception quality of a nearby cell in a period different from the period enabling reception of the downlink control channel.

The period enabling reception of the downlink control channel is a period enabling transmission of an uplink shared control signaling channel.

The downlink control channel is a control channel that contains scheduling information on radio resources for a downlink data channel in the same time slot in which the control channel is placed.

The mobile station device transmits downlink channel propagation path quality information in timing that is associated with the period enabling reception of the downlink control channel, and receives a control channel containing scheduling information on radio resources for the uplink data channel.

When the base station device and the mobile station device have a table having stored thereon the intervals corresponding to the types of services, the RRC message may include a category number stored on the table.

When intervals between the periods enabling reception vary, the intervals are determined to be multiples to each other.

The interval is set by any one of the following methods of:

(1) setting the interval depending on the radio quality of the mobile station device;

(2) setting the interval depending on the type of a service carried out by the mobile station device;

(3) setting the interval of a different value depending on a case of securing a communication link for the mobile station device and on a case of not securing the communication link.

The interval may be adjusted in such a way that the base station device communicates a bit indicative of stepping up or stepping down the interval in time slots to the mobile station device to cause the mobile station device to adjust the interval depending on the bit.

Effect of the Invention

The present invention offers a radio communication system that set a transmission/reception enabling period and a transmission/reception suspension period according to the type of a service on an uplink and on a downlink to allow a mobile station device to reduce power consumption and allow a base station device to perform efficient scheduling while taking service into consideration.

BRIEF DESCRIPTION OF THE DRAWINGS

FIG. 13 is an example of parameters for improving radio quality;

EXPLANATIONS OF REFERENCE NUMERALS

Figure 1:
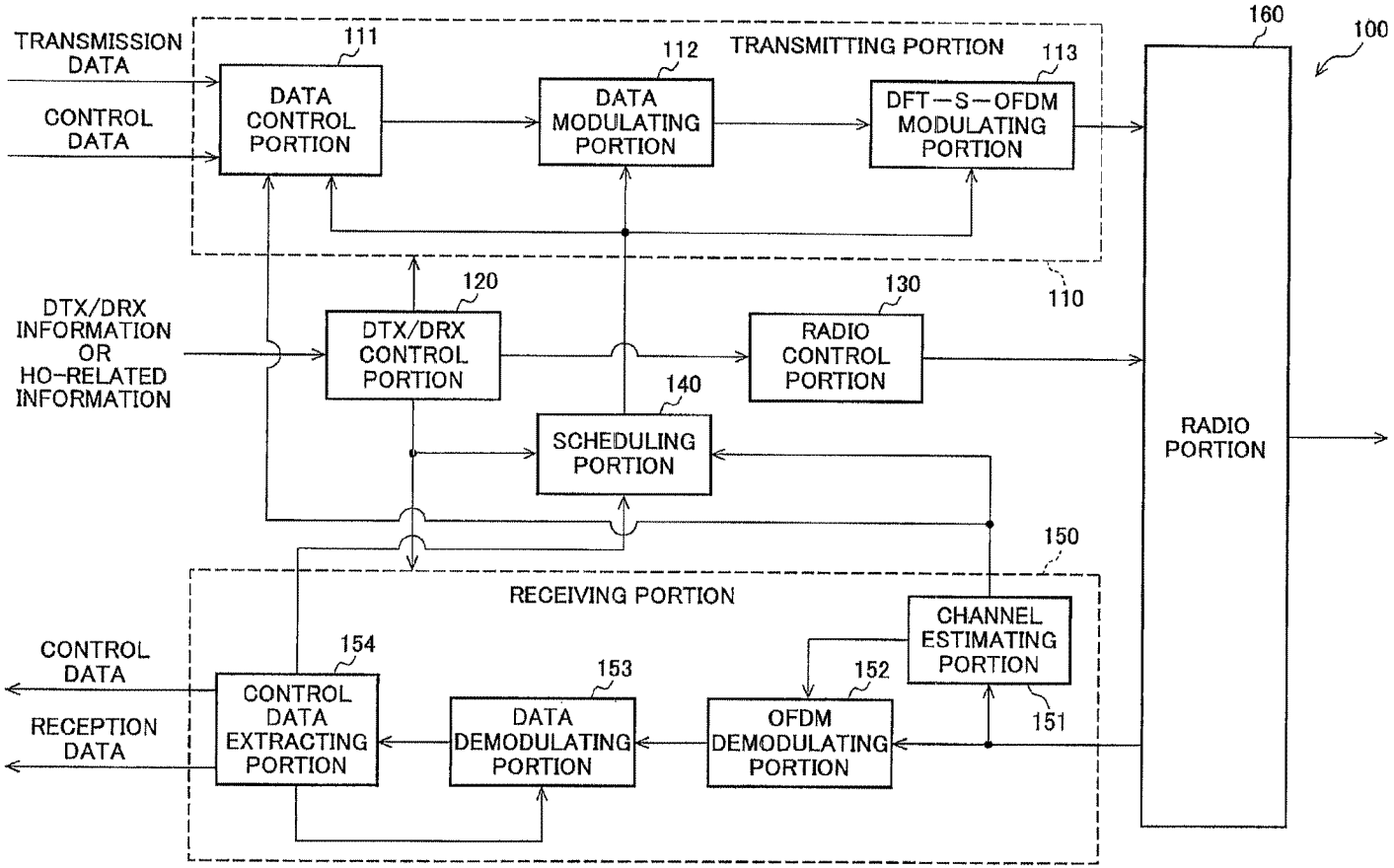
FIG. 1 is a block diagram of a configuration of a mobile station device of the present invention.

100, 100$_1$, 100$_2$, 100$_n$ . . . mobile station device
110 . . . transmitting portion
111 . . . data control portion
112 . . . data modulating portion
113 . . . DFT-S-OFDM modulating portion
120 . . . DTX/DRX control portion
130 . . . radio control portion
140 . . . scheduling portion
150 . . . receiving portion
151 . . . channel estimating portion
152 . . . OFDM demodulating portion
153 . . . data demodulating portion
154 . . control data extracting portion
160 . . . radio portion
200 . . . base station device
210 . . . data control portion
220 . . . data modulating portion
230 . . . OFDM modulating portion
240 . . . scheduling portion
241 . . . DL scheduling portion
242 . . . UL scheduling portion
250 . . . channel estimating portion
260 . . . DFT-S-OFDM demodulating portion
270 . . . data demodulating portion
280 . . . control data extracting portion
290 . . . radio portion

PREFERRED EMBODIMENTS OF THE INVENTION

Preferred embodiments of a mobile station device, a base station device, and a radio communication system including the mobile station device and the base station device according to the present invention will now be described with reference to the drawings.

The following is the definition of terms used in this specification.

DCFC (Downlink CQI Feedback Cycle) represents an interval in which a mobile station device measures a downlink pilot channel DPiCH and calculates a downlink CQI to transmit the downlink CQI to a base station device.

UAP (Uplink Active Period) represents a period in which the mobile station device is able to transmit control information and user data through an uplink (or a period in which the base station device is able to carry out scheduling on the uplink for the mobile station device). A downlink CQI is transmitted at the start of a UAP.

DAP (Downlink Active Period) represents a period in which the mobile station device is able to receive control information and user data from the base station device through the downlink (or a period in which the base station device is able to schedule control information and user data addressed to the mobile station device on the downlink and transmit the control information and user data through the downlink to the mobile station device).

USC (Uplink Scheduling Cycle) represents an interval from the start of a UAP and the start of the next UAP.

DSC (Downlink Scheduling Cycle) represents an interval from the start of a DAP and the start of the next DAP.

Figure 2:
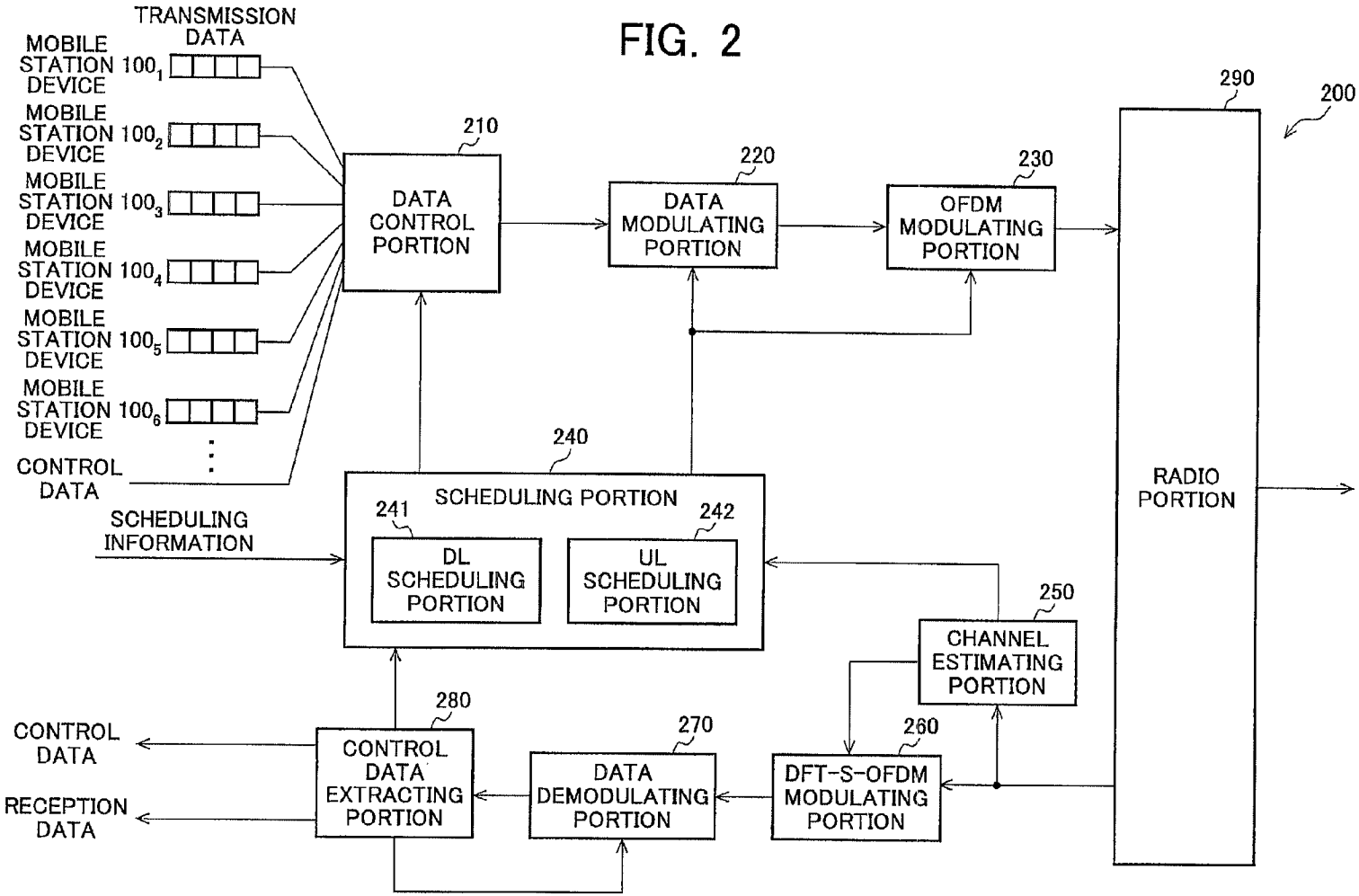
FIG. 2 is a block diagram of a configuration of a base station device of the present invention.

FIG. 1 is a block diagram of a configuration of a mobile station device 100, and FIG. 2 is a block diagram of a configuration of a base station device 200.

In FIG. 1, the mobile station device 100 includes a transmitting portion 110, a DTX/DRX control portion 120, a radio control portion 130, a scheduling portion 140, a receiving portion 150, and a radio portion 160.

The transmitting portion 110 includes a data control portion 111, a data modulating portion 112, and a DFT-S-OFDM modulating portion 113. The receiving portion 150 includes a channel estimating portion 151, an OFDM (DFT-spread OFDM) demodulating portion 152, a data demodulating portion 153, and a control data extracting portion 154.

The data control portion 111 receives input of transmission data or control data, and follows an instruction from the scheduling portion 140 to arrange control data, CQI information, and transmission data to transmit them through a contention-based channel CBCH or an uplink scheduling channel USCH.

The data modulating portion 112 modulates control data and transmission data, using a modulating/coding method indicated by AMC information delivered from the scheduling portion 140 to the data modulating portion 112.

The DFT-S-OFDM modulating portion 113 receives input of modulated transmission data or control data, and carries out serial-to-parallel conversion and spreading code/scrambling code multiplication on input data, and then subjects the input data to DFT-spread OFDM signal processing, such as DFT, subcarrier mapping, IFFT (Inverse Fast Fourier Transform), CP (Cyclic Prefix) insertion, and filtering, to generate a DFT-spread OFDM signal.

It is assumed that a single-carrier method, such as DFT-spread OFDM and VSCRF-CDMA, is adopted as a communication method on the uplink, but a multicarrier method, such as OFDM, may also be adopted as the communication method on the uplink.

The radio portion 160 sets a radiofrequency specified by an instruction from the radio control portion 130, upconverts modulated data to give it the set radiofrequency, and transmits the upconverted data to the base station device 200.

The radio portion 160 receives downlink data from the base station device 200, downconverts the received data into a base band signal, and delivers the downconverted data to the OFDM demodulating portion 152.

The channel estimating portion 151 estimates radio propagation path characteristics from a downlink pilot channel DPiCH, and delivers an estimation result to the OFDM demodulating portion 152. To communicate the radio propagation path estimation result to the base station device 200, the channel estimating portion 151 converts the estimation result into CQI information and delivers the CQI information to the data control portion 111 and to the scheduling portion 140.

The OFDM demodulating portion 152 performs OFDM signal processing, such as CP elimination, filtering, and FFT, to demodulate an OFDM signal, based on a downlink radio propagation path estimation result from the channel estimating portion 151.

The data demodulating portion 153 demodulates received data, based on downlink AMC information extracted from the control data extracting portion 154.

The control data extracting portion 154 splits received data into user data and control data (downlink shared control signaling channel DSCSCH and downlink common control channel DCCCH). AMC information on the downlink in control data is sent to the data demodulating portion 153, while AMC information and scheduling information on the uplink is delivered to the scheduling portion 140.

In response to AMC information and scheduling information on the uplink sent from the base station device 200, the scheduling portion 140 gives an instruction on transmission of transmission data and control data to the data control portion 111, the data modulating portion 112, and the DFT-S-OFDM modulating portion 113 so that the mobile station device 100 actually maps the transmission data and control data on physical channels.

The DTX/DRX control portion 120 calculates a transmission suspension period and a reception suspension period from parameters of DCFC, USC, DCS, UAP, and DAP from a superior layer, and stops the transmitting portion 110 or the receiving portion 150 during the transmission suspension period or the reception suspension period. When receiving an instruction on measuring another cell from the superior layer, the DTX/DRX control portion 120 issues an instruction on frequency change to measure another cell during the suspension period.

In FIG. 2, the base station device 200 includes a data control portion 210, a data modulating portion 220, an OFDM modulating portion 230, a scheduling portion 240, a channel estimating portion 250, a DFT-S-OFDM demodulating portion 260, a data demodulating portion 270, a control data extracting portion 280, and a radio portion 290.

The scheduling portion 240 includes a DL scheduling portion 241 that carries out scheduling on the downlink, and a UL scheduling portion 242 that carries out scheduling on the uplink.

The data control portion 210 receives input of transmission data addressed to each mobile station device $\mathbf{100}_n$ and control data, and, following an instruction from the scheduling portion 240, maps the control data on a common control channel CCCH, a synchronization channel SCH, a pilot channel PiCH, and a shared control Channel SCCH while maps the transmission data addressed to each mobile station device $\mathbf{100}_n$ on a shared data channel SDCH.

The data modulating portion 220 modulates data using a data modulating/coding method indicated by AMC information delivered from the scheduling portion 240 to the data modulating portion 220.

The OFDM modulating portion 230 carries out OFDM signal processing, such as serial-to-parallel conversion, IFFT, CP insertion, and filtering, on an input signal to generate an OFDM signal.

The radio portion 290 upconverts data subjected to OFDM modulation to give the data a radiofrequency, and transmits the upconverted data to the mobile station device. The radio portion 290 receives uplink data from the mobile station device $\mathbf{100}_n$, downconverts the received data into a base band signal, and delivers the downconverted data to the DFT-S-OFDM demodulating portion 260 and to the channel estimating portion 250.

The channel estimating portion 250 estimates radio propagation path characteristics from an uplink pilot channel UPiCH, and delivers an estimation result to the DFT-S-OFDM demodulating portion 260. To carry out scheduling on the uplink, the channel estimating portion 250 delivers the radio propagation path estimation result to the scheduling portion 240.

The DFT-S-OFDM demodulating portion 260 performs filtering, CP elimination, DFT, and IFFT to demodulate a DFT-S-OFDM signal, based on a downlink radio propagation path estimation result from the channel estimating portion 250.

The data demodulating portion 270 demodulates received data, based on downlink AMC information extracted from the control data extracting portion 280.

The control data extracting portion 280 splits received data into user data (uplink shared control signaling channel USCSCH) and control data (uplink shared control signaling channel USCSCH) to deliver split data to a superior layer. AMC information on the uplink in control data is sent to the data demodulating portion 270, and CQI information on the downlink is delivered to the scheduling portion 240.

The DL scheduling portion 241 of the scheduling portion 240 carries out scheduling for mapping user data on each channel of the downlink and calculates AMC for modulating each data, from CQI information sent from the mobile station device 100, and user data sent from a superior layer.

The UL scheduling portion 242 carries out scheduling for mapping user data on each channel of the uplink and calculates AMC for modulating each data, from an uplink radio propagation path estimation result from the channel estimating portion 250 and a resource assignment request from the mobile station device $\mathbf{100}_n$.

Figure 3:
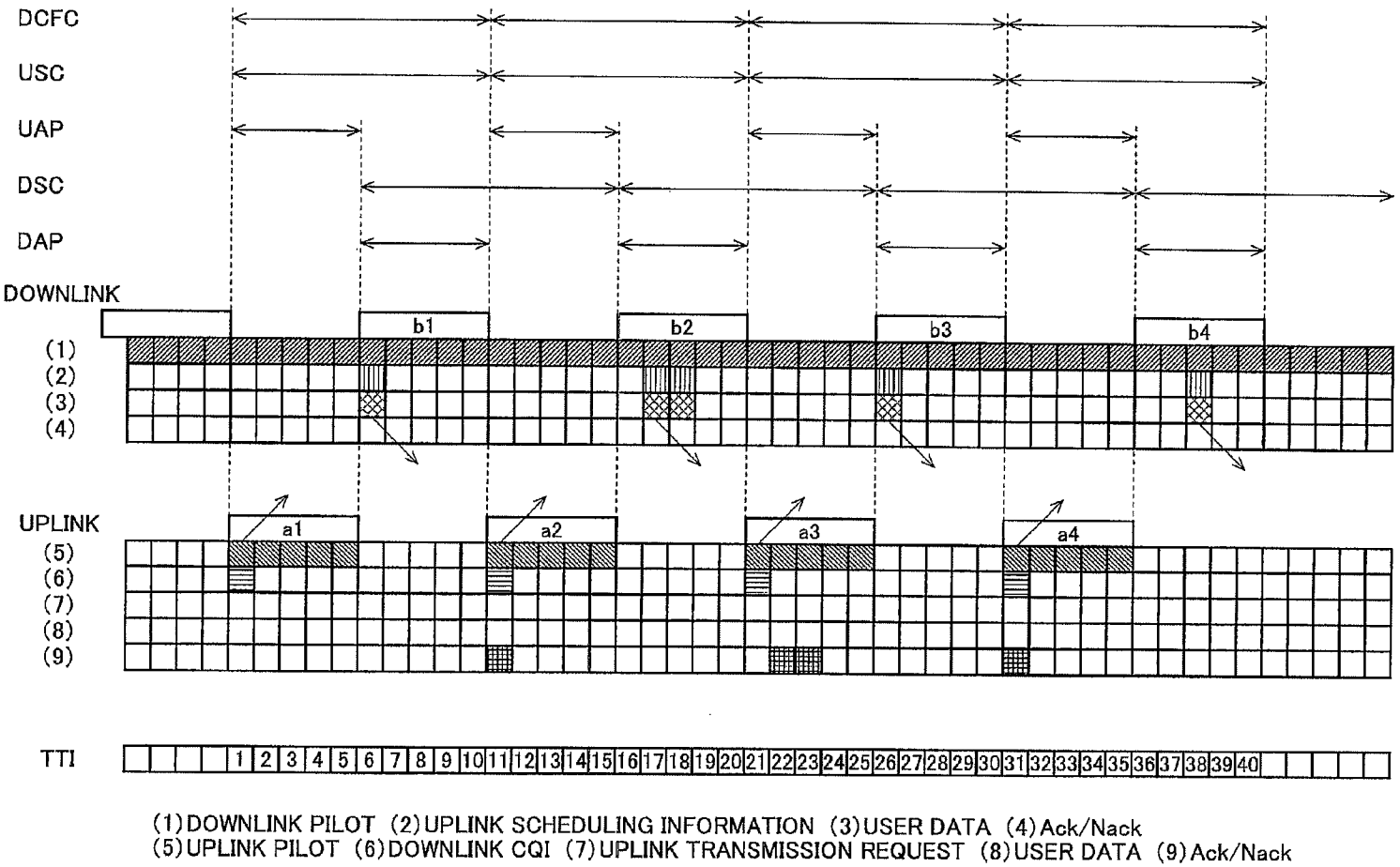
FIG. 3 is an explanatory diagram of the basic operation of the present invention.

The basic operation of the present invention will then be described referring to FIG. 3.

The mobile station device 100 transmits a downlink CQI in a UAP, repeats at intervals of DCFC, and receives a downlink pilot in a DAP to measure a down link CQI.

The mobile station device 100 receives user data or control information (uplink scheduling information or response information to user data) that is addressed to the mobile station device 100.

In a UAP, the mobile station device 100 transmits an uplink pilot and when having user data or control information to transmit (uplink scheduling request information or response information to user data (ACK/NACK)), transmits the user data or control information.

The base station device 200 calculates an uplink CQI from an uplink pilot that is transmitted by the mobile station device 100 during a UAP for the mobile station device 100, and carries out scheduling to enable the mobile station device 100 to carry out data transmission through the uplink.

The base station device 200 receives user data and control information from the mobile station device 100. In a DAP for the mobile station device 100, the base station device 200 schedules data and control information addressed to the mobile station to transmit the data and control information to the mobile station device 100. The base station device 200 constantly transmits a downlink pilot.

A UAP and a DAP are determined depending on a delay in a radio section between the base station device 200 and the mobile station device 100, a processing time in the base station device 200 and that in the mobile station device 100, the effectiveness of a CQI in the radio section, and a cycle of a response informing of success/failure in data reception.

A USC and a DSC are controlled dynamically depending on the fluctuation characteristics of data traffic during communication service.

(An interval as a) DAP and (an interval as a) UAP are each equivalent to an effective period of a CQI, and the minimum interval of USC and of DSC is equivalent to a cycle of a response informing of success/failure in data reception. The cycle of a response informing of success/failure in data reception must be estimated on a time to take from a delay in a propagation path following data transmission, through a decoding process at the receiver, to a point of time of enabling a response.

It is also necessary to consider a time to take from measurement of a downlink CQI and transmission of downlink CQI information, through a delay in the propagation path and the decoding process at the receiver, to a point of time of enabling scheduling. In this embodiment, a time to take from the transmitter's transmitting data to the receiver's processing the data and sending a response is determined to be 5 TTIs. The system can be simplified by controlling DAP, UAP, USC, and DSC through multiples thereof.

FIRST OPERATION EXAMPLE

Figure 4:
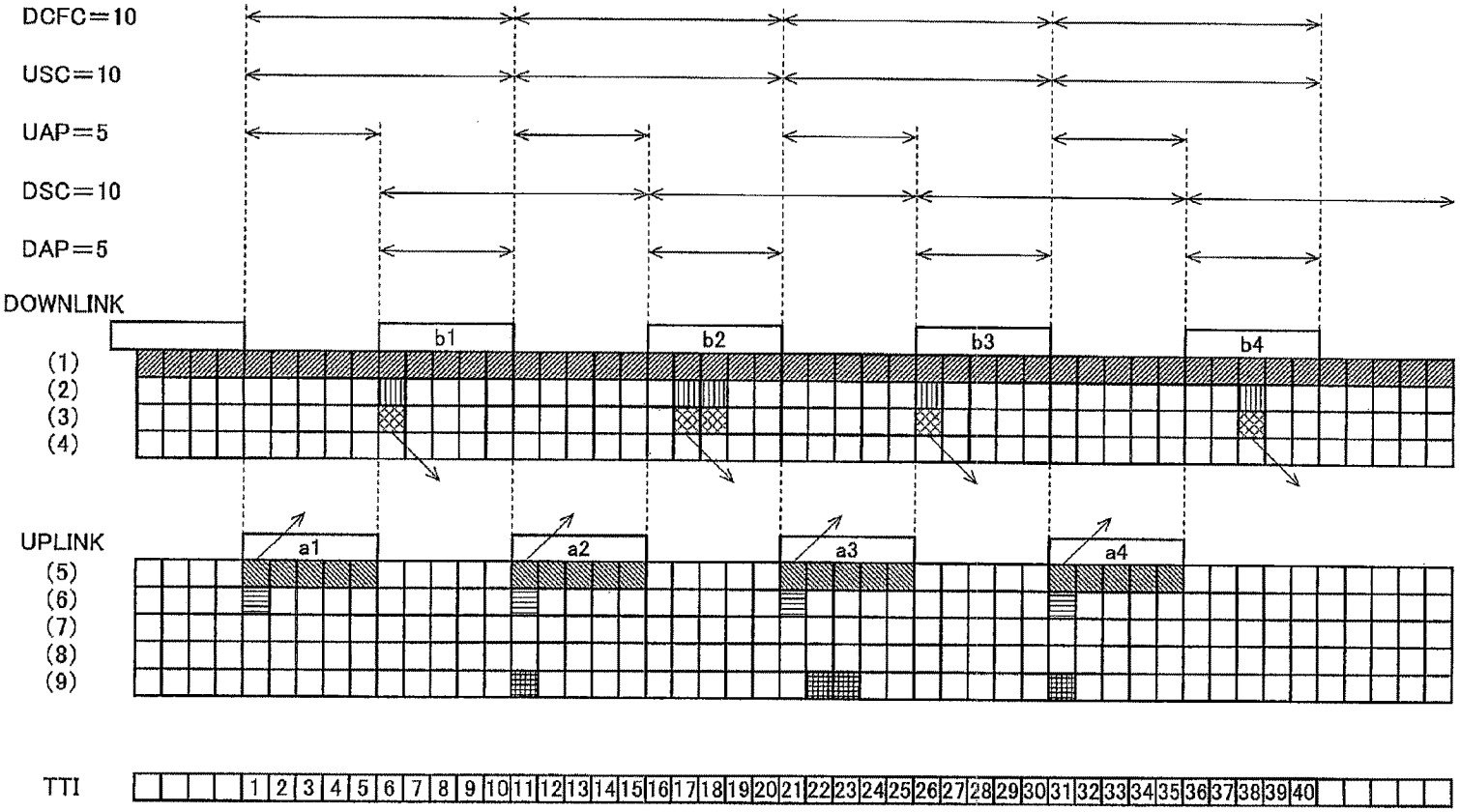
FIG. 4 is a diagram of a first operation example.

FIG. 4 depicts a specific first operation example on the downlink.

When DCFC is 10 TTIs, USC is 10 TTIs, DSC is 10 TTIs, UAP is 5 TTIs, and DAP is 5 TTIs, the following operation is carried out. For a simpler explanation, a case of the presence of user data only on the downlink will be described.

The mobile station device 100 transmits downlink CQIs at intervals of 10 TTIs.

In receiving downlink data, the mobile station device executes a reception process for the interval equivalent to 5 TTIs and suspends the reception process for the interval equivalent to 5 TTIs, thus repeats a cycle of execution/suspension of the reception process. In transmitting uplink data, the mobile station device 100 executes a transmission process for the interval equivalent to 5 TTIs and suspends the transmission process for the interval equivalent to 5 TTIs.

The base station device 200 carries out scheduling on the uplink at intervals of 10 TTIs, with 5 TTIs spent for each scheduling, and carries out scheduling on the downlink at intervals of 10 TTIs, with 5 TTIs spent for each scheduling.

Hereinafter, the scheduled order of uplink pilots are expressed as UAP (a1), UAP (a2), UAP (a3), UAP (a4), . . . , and the scheduled order of downlink pilots are expressed as DAP (a1), DAP (a2), DAP (a3), DAP (a4), . . . .

An uplink pilot and a downlink pilot at a point of time TTI=t are expressed as UAP (a1:t) and DAP (b1:t).

The mobile station device 100 makes a downlink CQI out of a downlink pilot. The mobile station device 100 transmits an uplink pilot in UAP (a1) on the uplink, and also transmits the downlink CQI to the base station device 200 at UAP (a1:1).

Receiving the downlink CQI, the base station device 200 schedules data addressed to the mobile station device 100 to set the data in DAP (b1) on the downlink, based on the downlink CQI.

The base station device 200 carries out scheduling for allowing the mobile station device 100 to send back a response to data (informing of success/failure in data reception) to set the response in UAP (a2), and transmits user data addressed to the mobile station device 100 and uplink scheduling information for sending back a response to the user data. In FIG. 4, the base station device 200 transmits data and control information at DAP (b1:6).

A scheduled point of user data addressed to the mobile station device 100 and a scheduled point of uplink scheduling information for sending back a response to the user data may be different from each other as long as both scheduled points are within DAP (b1).

A scheduling position for sending back a response may be specified by a control signal from the base station device 200, or may be determined suggestively by the mobile station device 100 and the base station device 200 based on the frequency of data transmission in a DAP.

Specifically, if user data is received and a response to the user data can be made after proceeding of a distance of 5 TTIs, the position corresponding to DAP (b1:6) is automatically determined to be UAP (a2:11) and the position corresponding to DAP (b2:17) is automatically determined to be UAP (a3:22).

The system may be configured in such a way that a predetermined condition is set in advance between the base station device 200 and the mobile station device 100 so that responses to user data scheduled to be at DAP (b2:17, b2:18) are transmitted collectively at UAP (a3:23) without a control signal in synchronous arrangement, in which the transmission position of the responses is determined suggestively.

The base station device 200 specifies a point of transmitting a response to user data by a control signal, and this response may be transmitted as a response including a collection of responses to pieces of user data that are received in the past.

The mobile station device 100 carries out the reception process in DAP (b1), and when finding the presence of data and control information addressed to the mobile station device 100, extracts and processes the data and control information. In FIG. 4, the mobile station device 100 finds the data and control information at DAP (b1:6), thus processing the data and control information. At UAP (a2:11), the mobile station device 100 transmits a downlink CQI to the base station device 200 while simultaneously sending back a response to user data received at DAP (b1:6).

In UAP (a2, a3, a4) and DAP (b2, b3, b4), the transmission/reception processes are carried out by the mobile station device 100 and the base station device 200 in the same manner as described above. In periods other than UAPs and DAPs, the reception process or transmission process by the mobile station device 100 is suspended.

In this manner, a transmission/reception suspension period is set in transmission/reception by the mobile station device 100 to reduce power consumption by a battery.

SECOND OPERATION EXAMPLE

Figure 5:
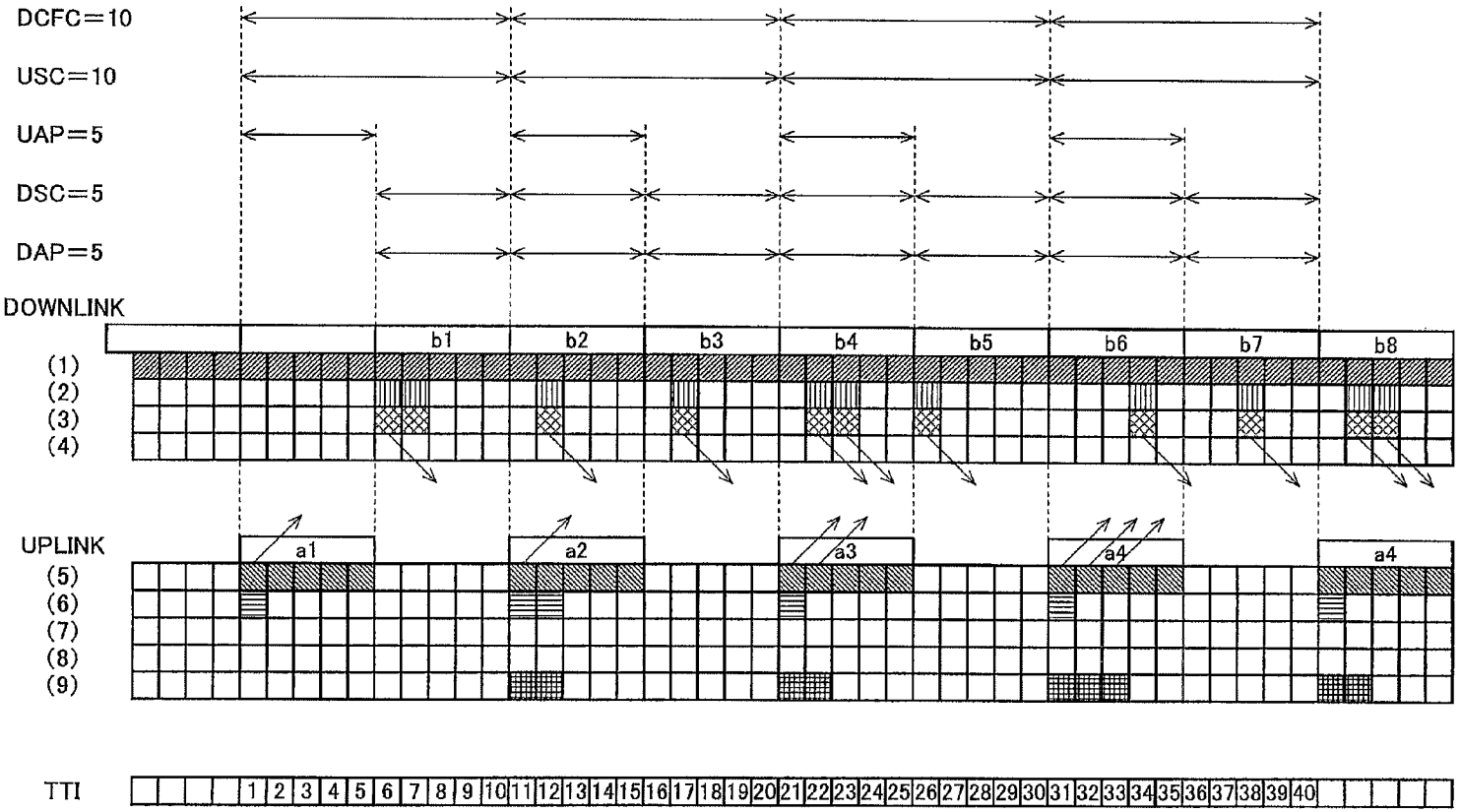
FIG. 5 is a diagram of a second operation example.

FIG. 5 depicts a second operation example in which user data volume is large on the downlink.

When DCFC is 10 TTIs, USC is 10 TTIs, DSC is 5 TTIs, UAP is 5 TTIs, and DAP is 5 TTIs, the following operation is carried out.

The mobile station device 100 transmits downlink CQIs at intervals of 10 TTIs. In transmitting uplink data, the mobile station device 100 executes the transmission process for the interval equivalent to 5 TTIs and suspends the transmission process for the interval equivalent to 5 TTIs, thus repeats a cycle of execution/suspension of the transmission process. The mobile station device 100, however, constantly carries out the reception process through the downlink.

The base station device 200 carries out scheduling on the uplink at intervals of 10 TTIs, with 5 TTIs spent for each scheduling, and carries out scheduling on the downlink at intervals of 5 TTIs, with 5 TTIs spent for each scheduling.

The mobile station device 100 makes a downlink CQI out of a downlink pilot. The mobile station device 100 transmits an uplink pilot in UAP (a1) on the uplink, and also transmits the downlink CQI to the base station device 200 at UAP (a1:1).

Receiving the downlink CQI, the base station device 200 schedules data addressed to the mobile station device to set the data in DAP (b1) on the downlink.

The base station device 200 carries out scheduling for allowing the mobile station device 100 to send back a response to data (informing of success/failure in data reception) to set the response in UAP (a2), and transmits user data addressed to the mobile station device 100 and uplink scheduling information for sending back a response to the user data. In FIG. 5, the base station device 200 transmits user data and control information at DAP (b1:6, b1:7).

A scheduled point of user data addressed to the mobile station device 100 and a scheduled point of uplink scheduling information for sending back a response to the user data may be different from each other as long as both scheduled points are within DAP (b1).

The uplink scheduling information for sending back a data response that is transmitted at DAP (b1:6) and DAP (b1:7) may be transmitted at the same point (e.g., only at DAP (b1:6)).

The mobile station device 100 carries out the reception process in DAP (b1), and when finding the presence of data and control information addressed to the mobile station device 100, extracts and processes the data and control information. In FIG. 5, the mobile station device 100 finds data and control information at DAP (b1:6, b1:7), thus processing the data and control information.

At UAP (a2:11), the mobile station device 100 transmits a downlink CQI to the base station device 200 while simultaneously sending back a response to the user data received at DAP (b1:6). At UAP (a2:12), the mobile station device 100 sends back a response to the user data received at DAP (b1:7).

As described in FIG. 4, when a plurality of pieces of user data from the base station device 200 are present in a DAP, points for the mobile station device 100 to send back responses to the user data may be scheduled to be at the same point (e.g., only at UAP (a2:12)). A scheduling position for sending back a response may be specified by a control signal from the base station device 200, or may be determined suggestively by the mobile station device 100 and the base station device 200 based on the frequency of data transmission in a DAP.

Scheduling a response to user data is complicated when a USC is different from a DSC in interval because responses to user data received at DAP (b2:12) and DAP (b3:17) must be scheduled to be in UAP (a3).

FIG. 5 shows that the maximum number of TTIs in which scheduled user data is present in two DAPs is not allowed to exceed 5 TTIs in a UAP.

In this case, responses to user data transmitted at DAP (b4:22, b4:23, b5:26) can be suggestively scheduled in the order of reception of the user data to be at UAP (a4:31, a4:32, a4:33).

If, however, the maximum number of TTIs in which scheduled user data is present in DAPs exceeds the number of TTIs in one UAP, a plurality of pieces of response information must be included in one TTI in the UAP to be transmitted.

In this case, however, the position of user data received last is associated suggestively with the position of a response to the data, and a response containing responses to user data received before the last received user data is transmitted. In this way, the system without using a control signal can be configured.

For example, responses to user data transmitted at DAP (b2:12, b3:17) are transmitted collectively at UAP (a3:22) that is equivalent to the position separated from DAP (b3:17) by a distance of 5 TTIs, and responses to user data transmitted at DAP (b4:22, b4:23, b5:26) are transmitted collectively at UAP (a4:31). In a more simple way, preliminary setting is made so that responses to user data transmitted in a DAP right before is transmitted collectively at the last TTI in the UAP.

This manes that responses to user data transmitted at DAP (b2:12, b3:17) are transmitted at UAP (a3:25).

The base station device 200 specifies a point of transmitting a response to user data by a control signal, and this response may be transmitted as a response including a collection of responses to pieces of user data that are received in the past.

For example, scheduling information on responses to user data transmitted at DAP (b2:12, b3:17) is included in scheduling information at DAP (b3:17), which scheduling information specifies collective transmission of the responses at UAP (a3:22).

In UAP (a2, a3, a4) and DAP (b2, b3, b4), the transmission/reception processes are carried out by the mobile station device 100 and the base station device 200 in the same manner. In periods other than UAPs and DAPs, the reception process or transmission process by the mobile station device 100 is suspended.

For more efficient transmission through the downlink, DCFC is determined to be 5 TTIs, USC to be 5 TTIs, DSC to be 5 TTIs, UAP to be 1 TTI, and DAP to be 5 TTIs. In other words, unnecessary UAP is shortened into an interval of 1 TTI, so that the remaining 4 TTIs can be assigned to other users and power consumption by the mobile station device 100 can be further reduced.

THIRD OPERATION EXAMPLE

Figure 6:
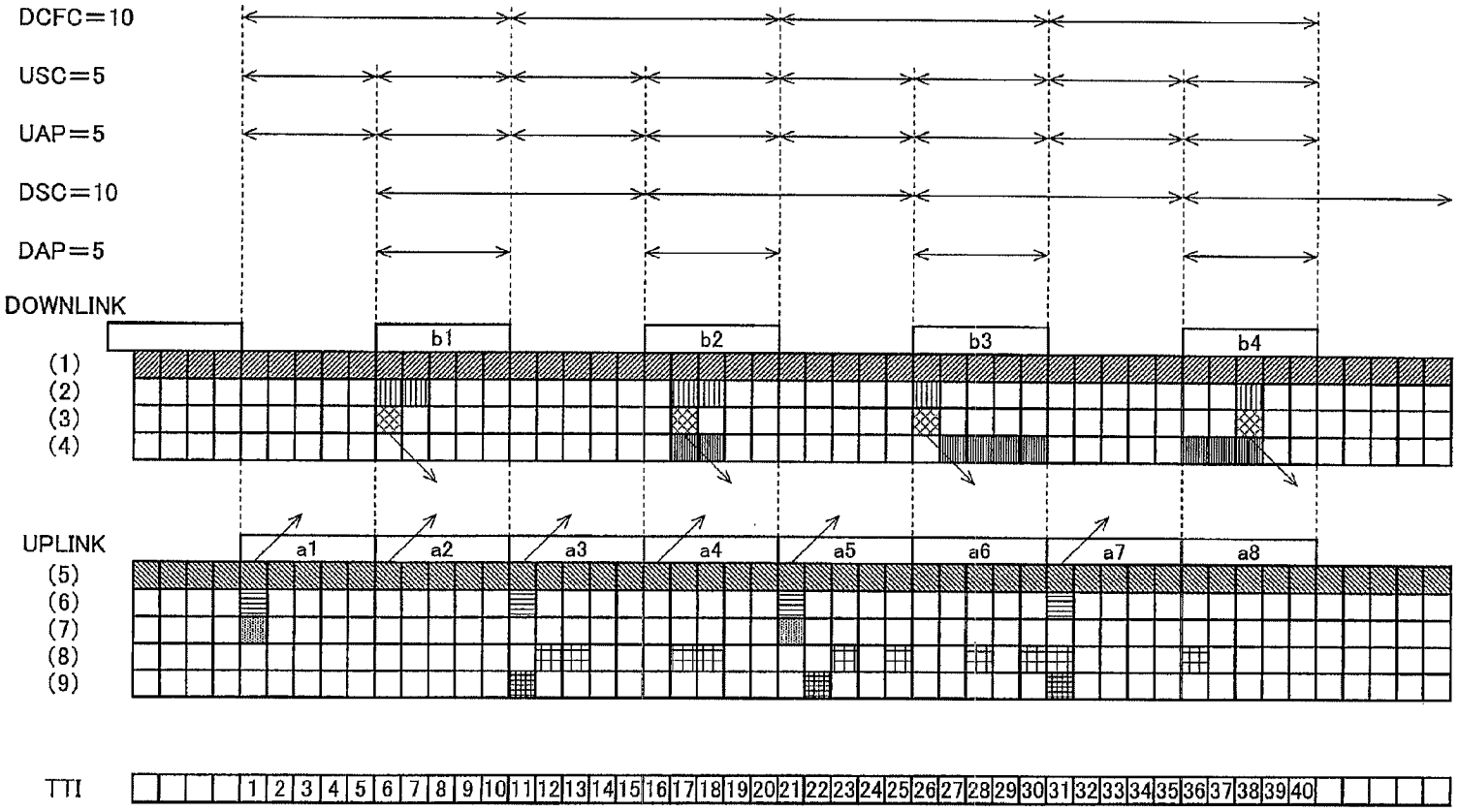
FIG. 6 is a diagram of a third operation example.

FIG. 6 depicts a third operation example in which data volume is large on the uplink.

When DCFC is 10 TTIs, USC is 5 TTIs, DSC is 10 TTIs, UAP is 5 TTIs, and DAP is 5 TTIs, the following operation is carried out.

The mobile station device 100 transmits downlink CQIs at intervals of 10 TTIs. In receiving downlink data, the mobile station device 100 executes the reception process for the interval equivalent to 5 TTIs and suspends the reception process for the interval equivalent to 5 TTIs, thus repeats a cycle of execution/suspension of the reception process. The mobile station device 100, however, constantly carries out the transmission process through the uplink.

The base station device 200 carries out scheduling on the uplink at intervals of 5 TTIs, with 5 TTIs spent for each scheduling, and carries out scheduling on the downlink at intervals of 10 TTIs, with 5 TTIs spent for each scheduling.

The mobile station device 100 makes a downlink CQI out of a downlink pilot. The mobile station device 100 transmits an uplink pilot in UAP (a1) on the uplink, and also transmits the downlink CQI and uplink scheduling transmission request information to the base station device 200 at UAP (a1:1).

Receiving the downlink CQI and uplink scheduling transmission request information, the base station device 200 schedules data addressed to the mobile station device 100 to set the data in DAP (b1) on the downlink. The base station device 200 then carries out scheduling for allowing the mobile station device 100 to send back a response to the data (informing of success/failure in data reception) to set the response in UAP (a3, a4).

The base station device 200 calculates an uplink CQI from an uplink pilot, and schedules uplink user data to set the uplink user data in UAP (a3, a4), based on the calculated uplink CQI and the uplink scheduling transmission request information. The base station device 200 then transmits the user data addressed to the mobile station device 100, the uplink scheduling information for sending back a response to the user data, and scheduling information on the uplink user data.

In FIG. 6, the user data and the scheduling information on the response to the data are transmitted at DAP (b1:6), while the scheduling information on the uplink user data is transmitted at (b1:7).

A scheduled point of the user data addressed to the mobile station device 100 and a scheduled point of the uplink scheduling information for sending back the response to the user data may be different from each other as long as both scheduled points are within DAP (b1).

Uplink scheduling transmission request information does not need to be transmitted when a scheduling information band is predetermined depending on the type of service and traffic volume. In such a case, for example, the uplink scheduling transmission request information may be used to change the current scheduling information band depending on a condition of buffering uplink user data.

The mobile station device 100 carries out the reception process in DAP (b1), and when finding the presence of data and control information addressed to the mobile station device 100, extracts and processes the data and control information. In FIG. 6, the mobile station device 100 finds the data and control information at DAP (b1:6), thus processing the data and control information. At UAP (a2:1), the mobile station device 100 transmits a downlink CQI to the base station device 200 while simultaneously sending back a response to the user data received at DAP (b1:6).

In UAP (a2, a3, a4) and DAP (b2, b3, b4), the transmission/reception processes are carried out by the mobile station device 100 and the base station device 200 in the same manner. In periods other than UAPs and DAPs, the reception process or transmission process by the mobile station device 100 is suspended.

Because a CQI is measured from an uplink pilot in a UAP adjacent to a DAP, uplink pilots for measuring CQI in UAP (a2, a4, a6, etc.) may not be transmitted in a different configuration. Pilots for demodulating user data that are transmitted at UAP (a4:17, a4:18, etc.), however, must be transmitted.

A scheduling position of sending back a response to uplink user data may be specified freely by the base station device, or may be determined suggestively by the mobile station device 100 and the base station device 200 based on the frequency of data transmission in a UAP, as in the case of a scheduling position of a response to downlink user data shown in FIG. 5.

For more efficient transmission through the downlink, DCFC is determined to be 5 TTIs, USC to be 5 TTIs, DSC to be 5 TTIs, UAP to be 5 TTIs, and DAP to be 1 TTI.

In other words, unnecessary DAP is shortened into an interval of 1 TTI, so that the remaining 4 TTIs can be assigned to other users and power consumption by the mobile station device 100 can be further reduced.

In this manner, when data volume is large on either of the uplink and the downlink, a transmission/reception suspension period is set to be able to reduce power consumption.

When data volume is large on both uplink and down link, DCFC is determined to be 5 TTIs, USC to be 5 TTIs, DSC to be 5 TTIs, UAP to be 5 TTIs, and DAP to be 5 TTIs.

FOURTH OPERATION EXAMPLE

Figure 7:
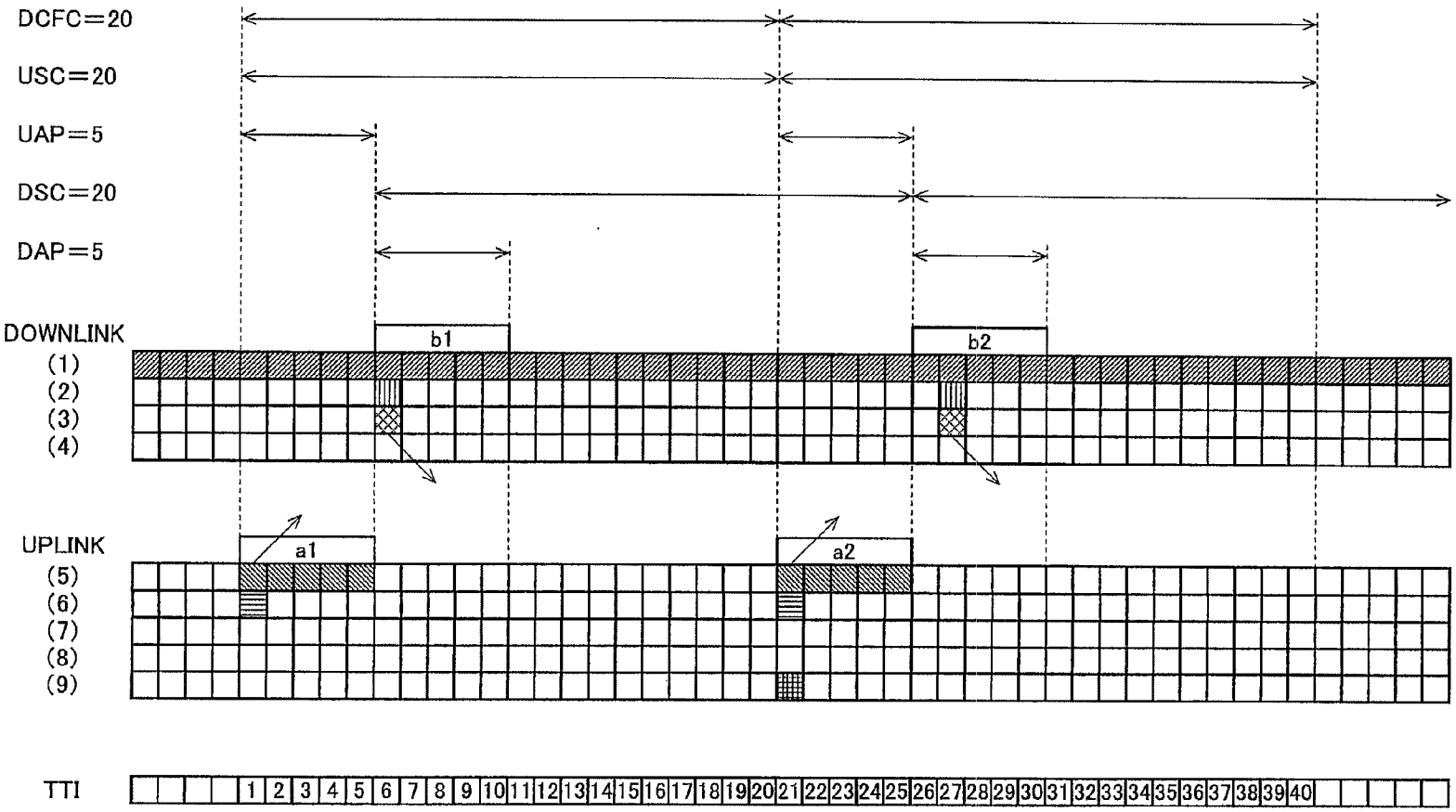
FIG. 7 is a diagram of a fourth operation example.

FIG. 7 depicts a fourth operation example in which data volume is small on both uplink and downlink.

When DCFC is 20 TTIs, USC is 20 TTIs, DSC is 20 TTIs, UAP is 5 TTIs, and DAP is 5 TTIs, the following operation is carried out.

The mobile station device 100 transmits downlink CQIs at intervals of 20 TTIs. In receiving downlink data, the mobile station device 100 executes the reception process for the interval equivalent to 5 TTIs and suspends the reception process for the interval equivalent to 5 TTIs, thus repeats a cycle of execution/suspension of the reception process. In transmitting uplink data, the mobile station device 100 executes the transmission process for the interval equivalent to 5 TTIs and suspends the transmission process for the interval equivalent to 5 TTIs, thus repeats a cycle of execution/suspension of the transmission process.

The base station device 200 carries out scheduling on the uplink at intervals of 20 TTIs, with 5 TTIs spent for each scheduling, and carries out scheduling on the downlink also at intervals of 20 TTIs, with 5 TTIs spent for each scheduling.

The mobile station device makes a downlink CQI out of a downlink pilot. The mobile station device 100 keeps transmitting an uplink pilot for an interval of 5 TTIs in UAP (a1) on the uplink, and also transmits the downlink CQI to the base station device at UAP (a1:1).

Receiving the downlink CQI, the base station device 200 schedules data addressed to the mobile station device 100 to set the data in DAP (b1) on the downlink. The base station device 200 then carries out scheduling for allowing the mobile station device 100 to send back a response to the data (informing of success/failure in data reception) to set the response in UAP (a2).

The base station device 200 calculates an uplink CQI from an uplink pilot, and schedules uplink user data to set the uplink user data in UAP (a2), based on the calculated uplink CQI and uplink scheduling transmission request information.

The base station device 200 then transmits the user data addressed to the mobile station device 100, uplink scheduling information for sending back a response to the user data, and scheduling information on the uplink user data. In FIG. 7, the user data and the scheduling information on the response to the data are transmitted at DAP (b1:6).

A scheduled point of the user data addressed to the mobile station device 100 and a scheduled point of the uplink scheduling information for sending back the response to the user data may be different from each other as long as both scheduled points are within DAP (b1).

The mobile station device 100 carries out the reception process in DAP (b1), and when finding the presence of data and control information addressed to the mobile station device 100, extracts and processes the data and control information. In FIG. 7, the mobile station device 100 finds the data and control information at DAP (b1:6), thus processing the data and control information.

At UAP (a2:1), the mobile station device 100 transmits a downlink CQI to the base station device 200 while simultaneously sending back a response to the user data received at DAP (b1:6).

In UAP (a2, a3, a4) and DAP (b2, b3, b4), the transmission/reception processes are carried out by the mobile station device 100 and the base station device 200 in the same manner. In periods other than UAPs and DAPs, the reception process or transmission process by the mobile station device 100 is suspended.

This enables intermittent reception that suppresses power consumption.

FIFTH OPERATION EXAMPLE

Figure 8:
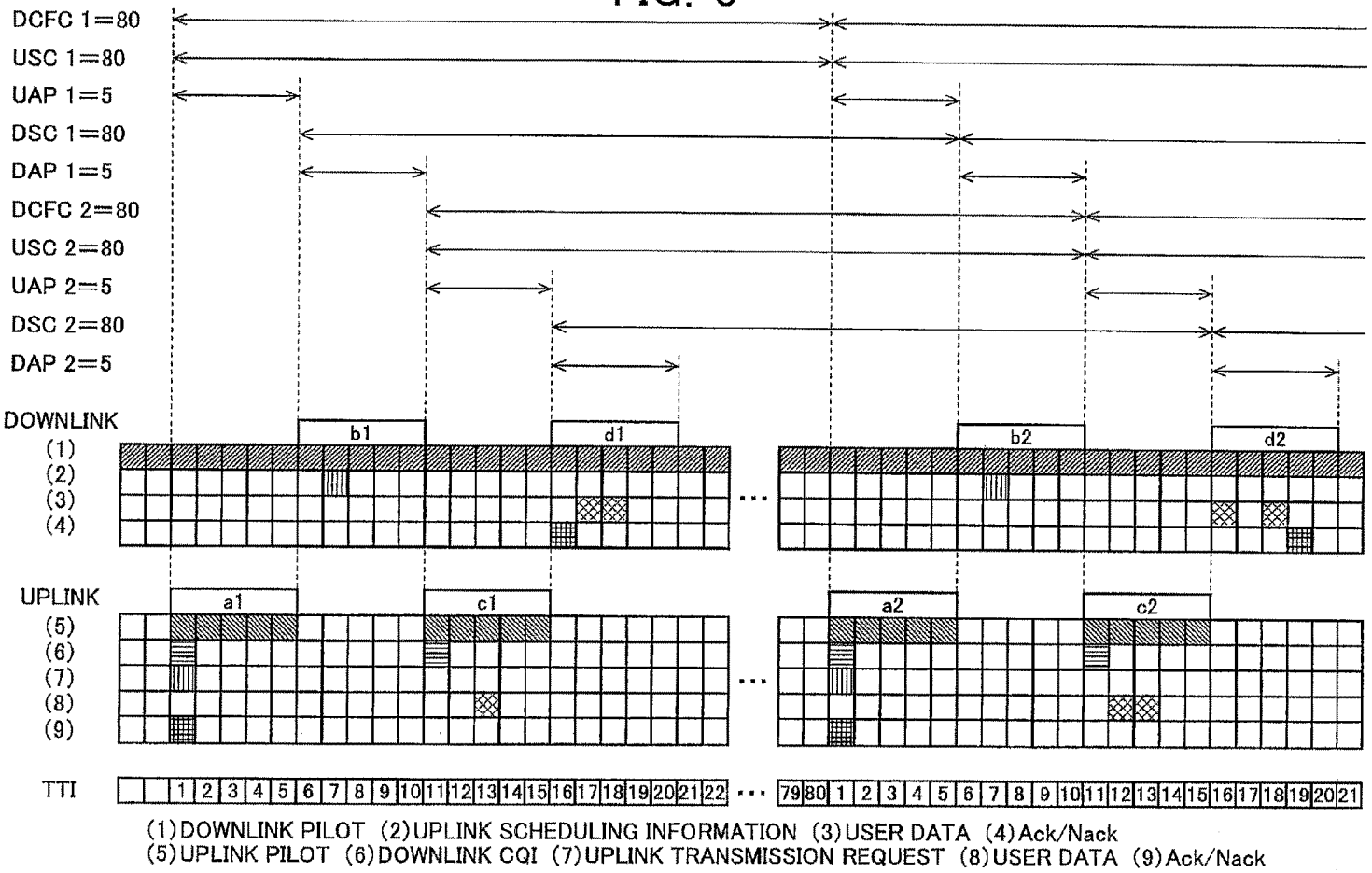
FIG. 8 is a diagram of a fifth operation example.

FIG. 8 depicts a fifth operation example in which data volume is small on both uplink and downlink.

In the case of FIG. 7, a long period of blank continues from a point of transmission of uplink scheduling information to a point of transmission of uplink data, and the condition of the radio propagation path fluctuates during that period. This brings about a problem that frequency scheduling appropriate to the uplink cannot be carried out. The same problem occurs on the downlink, too. This problem happens when DCFC, USC, and DSC are long intervals, and does not happen in such a high-speed data communication environment as described in FIGS. 5 and 6 because DAP and UAP can be shared for CQI measuring or transmission of a CQI measuring pilot in high-speed data communication.

For the above reason, a downlink CQI measuring period, a downlink CQI information transmission period, an uplink pilot transmission period, and an uplink scheduling request transmission period are processed as control parameters, and a downlink data transmission period and an uplink data transmission period are processed as data parameters. Operation is thus carried out using two types of parameters.

For the control parameters, DCFC1 is determined to be 80 TTIs, USC1 to be 80 TTIs, DSC1 to be 80 TTIs, UAP1 to be 5 TTIs, and DAP1 to be 5 TTIs. For the data parameters, DCFC2 is determined to be 80 TTIs, USC2 to be 80 TTIs, DSC2 to be 80 TTIs, UAP2 to be 5 TTIs, and DAP2 to be 5 TTIs. In FIG. 8, a sequence of an uplink UAP and a downlink DAP makes up one set, as in the case of FIG. 7.

In this case, the following operation is carried out.

The mobile station device 100 makes a downlink CQI out of a downlink pilot. The mobile station device 100 keeps transmitting an uplink pilot for an interval of 5 TTIs in UAP (a1) on the uplink, and also transmits the downlink CQI, a response to previously received data (informing of success/failure in data reception), and uplink scheduling transmission request information to the base station device 200 at UAP1 (a1:1).

The base station device 200 calculates an uplink CQI from an uplink pilot, and schedules uplink user data to set the uplink user data in UAP2 (c1), based on the calculated uplink CQI and the uplink scheduling transmission request information.

Based on the downlink CQI, the base station device 200 also carries out scheduling for transmitting uplink scheduling information in DAP (b1) on the downlink, thus transmitting the uplink scheduling information to the mobile station device 100.

In FIG. 8, the uplink scheduling information is transmitted at DAP (b1:2). In scheduling for transmitting the uplink scheduling information, using the downlink CQI transmitted at UAP1 (a1:1) is not absolute necessity.

The mobile station device 100 carries out the reception process in DAP (b1), and when finding the presence of data and control information addressed to the mobile station device 100, extracts and processes the data and control information. In FIG. 8, the mobile station device 100 finds the control information at DAP1 (b1:2), thus processing the control information.

The mobile station device 100 makes a downlink CQI out of a downlink pilot. The mobile station device 100 keeps transmitting an uplink pilot for an interval of 5 TTIs in UAP2 (c1) on the uplink, and transmits the downlink CQI to the base station device at UAP2 (c1:1), then transmits user data at UAP2 (c1:3), based on the uplink scheduling information.

Receiving the downlink CQI, the base station device 200 schedules data addressed to the mobile station device 100 to set the data in DAP2 (d1) on the downlink. The base station device 200 also carries out scheduling for sending back a response to uplink user data.

The base station device 200 transmits the response to the uplink user data at DAP2 (d1:1) on the downlink, and transmits downlink user data at DAP2 (d1:2), (d1:2).

In UAP (a2, c2) and DAP (b2, d2), the transmission/reception processes are carried out by the mobile station device 100 and the base station device 200 in the same manner. In periods other than UAPs and DAPs, the reception process or transmission process by the mobile station device 100 is suspended.

As a result, intermittent reception suppressing power consumption can be carried out as radio-channel-dependent scheduling using nearby CQI information is performed.

When data is not present, the mobile station device 100 does nothing but transmitting an uplink pilot and a downlink CQI while the base station device 200 does nothing but calculating an uplink CQI from an uplink pilot.

When the mobile station device 100 has data to transmit, the mobile station device 100 sends an uplink scheduling request in a UAP to start an operation based on one of parameters No. 1 to No. 4 (see FIG. 13 to be described later). Likewise, when the base station device 200 has data to transmit to the mobile station device 100, an operation based on one of parameters No. 1 to No. 4 (see FIG. 13 to be described later) starts.

SIXTH OPERATION EXAMPLE

Figure 9:
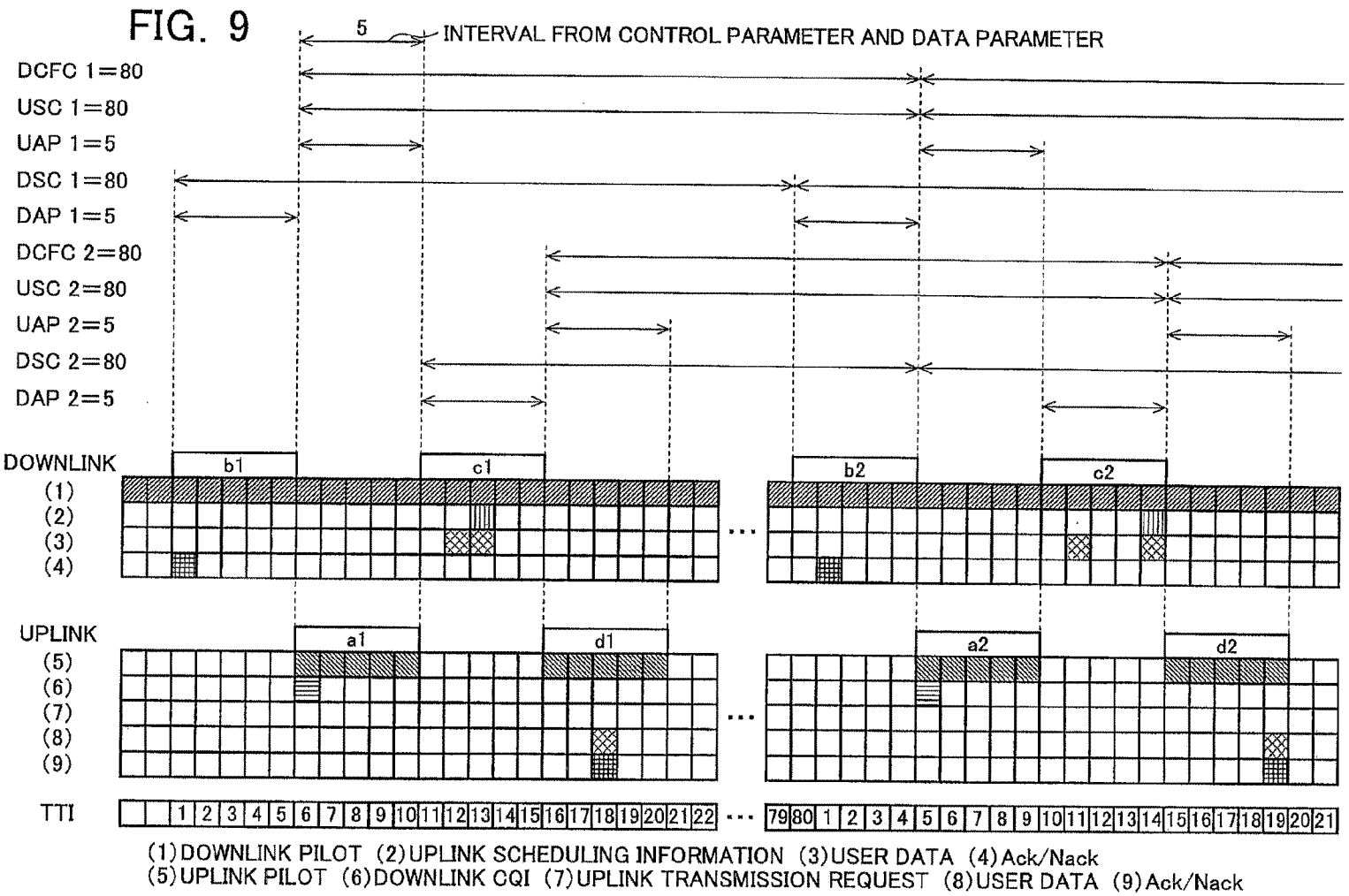
FIG. 9 is a diagram of a sixth operation example.

FIG. 9 depicts a sixth operation example in which data volume is small on both downlink and uplink.

For the control parameters, DCFC1 is determined to be 80 TTIs, USC1 to be 80 TTIs, DSC1 to be 80 TTIs, UAP1 to be 5 TTIs, and DAP1 to be 5 TTIs. For the data parameters, DCFC2 is determined to be 80 TTIs, USC2 to be 80 TTIs, DSC2 to be 80 TTIs, UAP2 to be 5 TTIs, and DAP2 to be 5 TTIs.

Different from the case of FIG. 8, a sequence of a downlink DAP and an uplink UAP makes up one set in FIG. 9.

In this case, the operation basically the same as that of the fifth operation example is carried out.

SEVENTH OPERATION EXAMPLE

Figure 10:
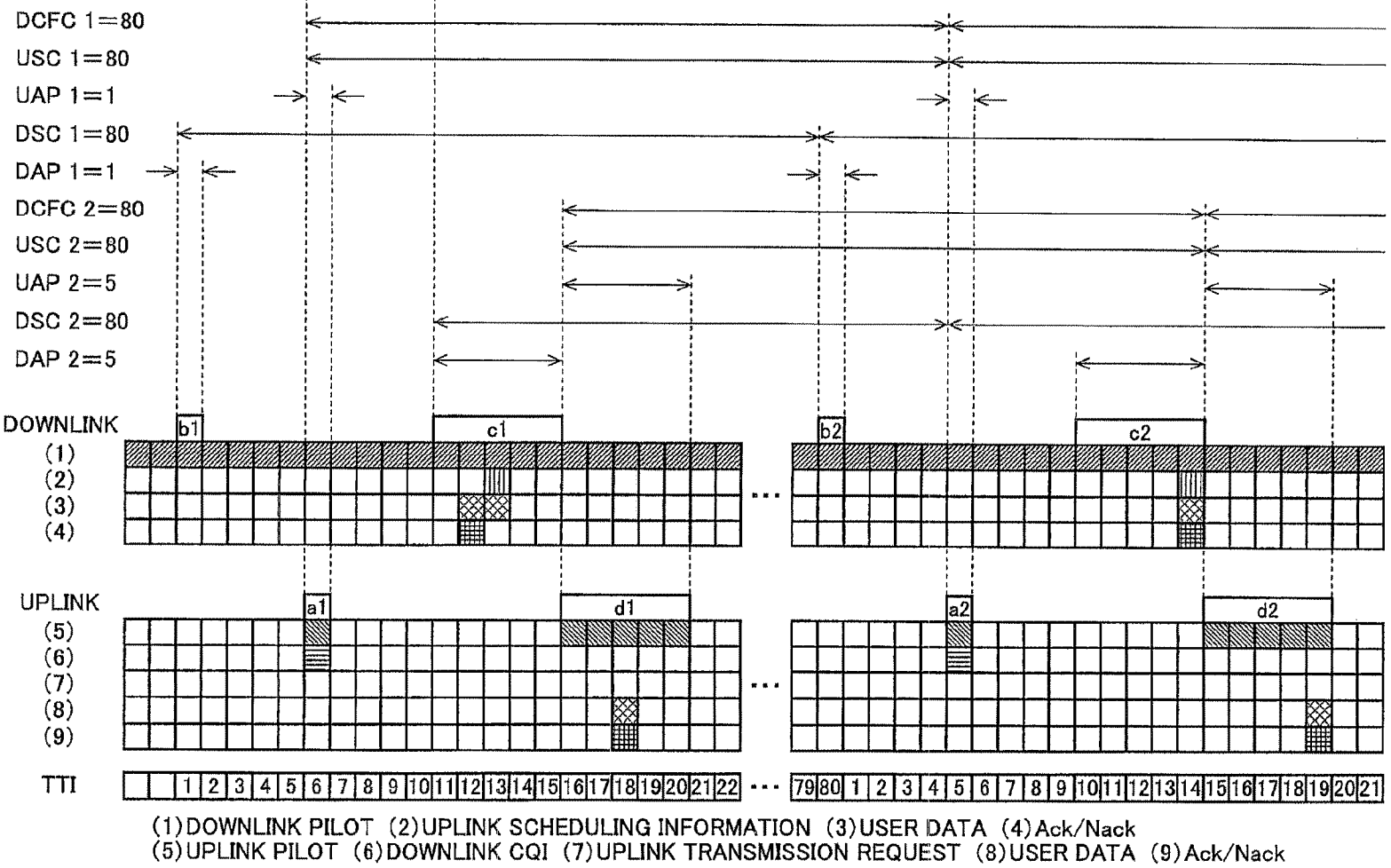
FIG. 10 is a diagram of a seventh operation example.

FIG. 10 depicts a seventh operation example in which data volume is small on both downlink and uplink.

For the control parameters, DCFC1 is determined to be 80 TTIs, USC1 to be 80 TTIs, DSC1 to be 80 TTIs, UAP1 to be 1 TTI, and DAP1 to be 1 TTI. For the data parameters, DCFC2 is determined to be 80 TTIs, USC2 to be 80 TTIs, DSC2 to be 80 TTIs, UAP2 to be 5 TTIs, and DAP2 to be 5 TTIs.

The case of FIG. 10 is different from the case of FIG. 9 in that UAP and DAP as control parameters are each determined to be 1 TTI. Because of this, scheduling corresponding to the condition of the radio propagation path can be carried out as UAP and DAP as control parameters are each determined to be the minimum unit interval to suppress power consumption.

In this case, the operation basically the same as that of the fifth operation example is carried out.

The best operation efficiency results when an interval of the control parameter and of the data parameter is determined to be 5 TTIs that is the minimum interval for reflecting control information.

EIGHTH OPERATION EXAMPLE

Figure 11:
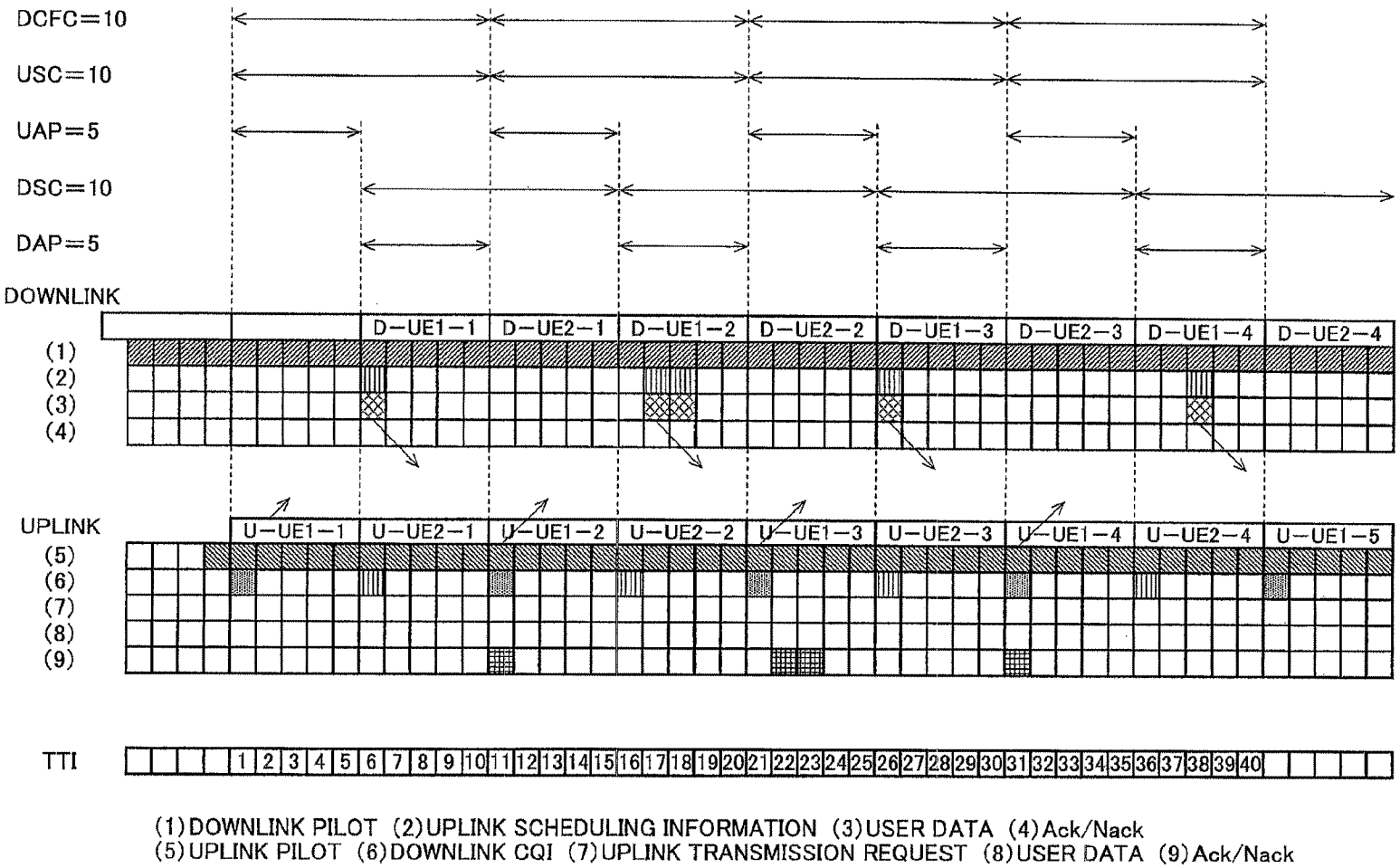
FIG. 11 is a diagram of an eighth operation example.

FIG. 11 depicts an example in which two mobile station devices 100 operate with parameters determined in such a way that DCFC is 10 TTIs, USC is 10 TTIs, DSC is 10 TTIs, UAP is 5 TTIs, and DAP is 5 TTIs. In this case, the mobile station device $\mathbf{100}_1$ (UE1) and the mobile station device $\mathbf{100}_2$ (UE2) enter Active Periods alternately on the downlink and the uplink.

In this case, the operation basically the same as that of the first operation example is carried out.

Allocating the mobile station devices in such a way enables efficient use of radio resources.

NINTH OPERATION EXAMPLE

Figure 12:
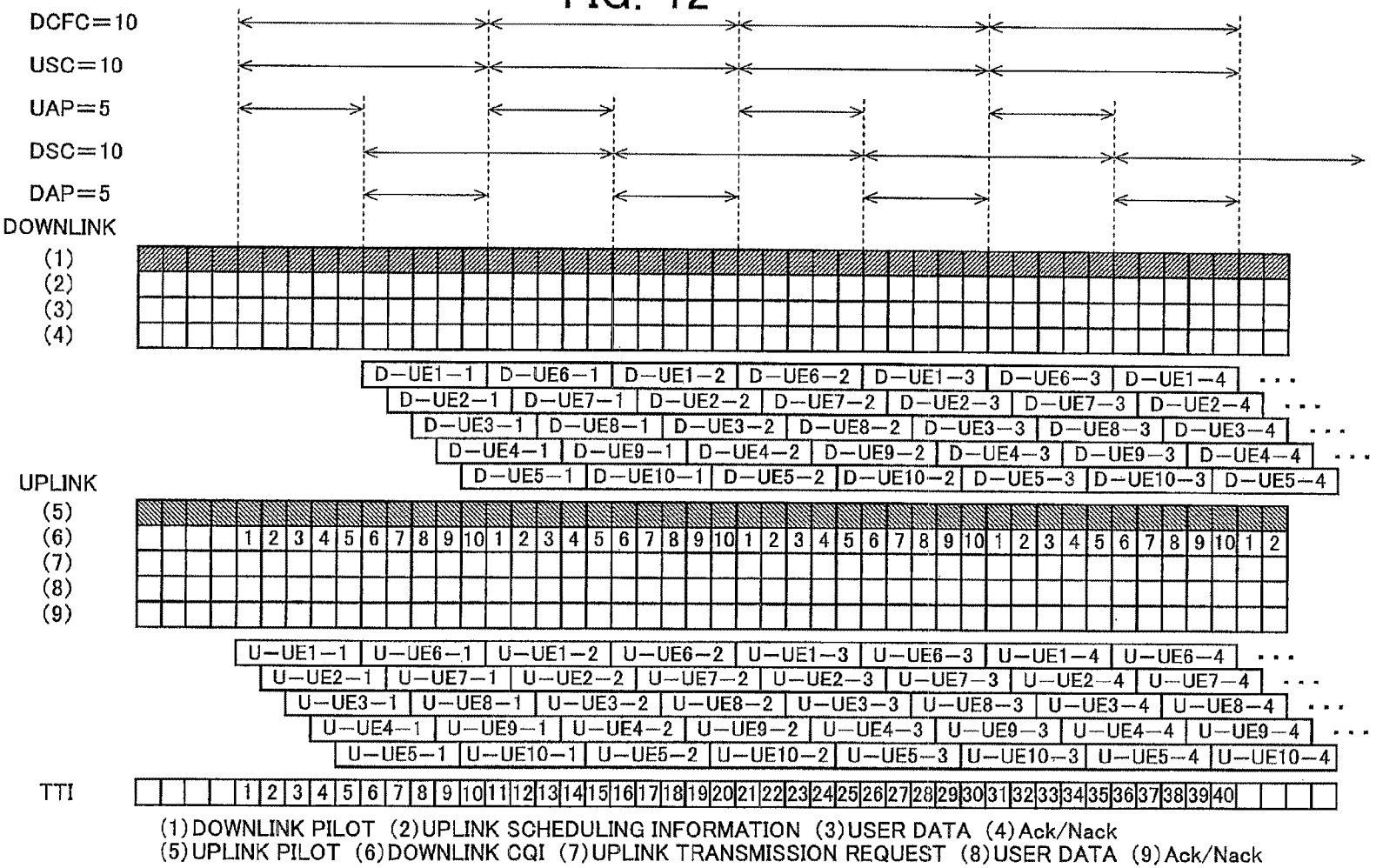
FIG. 12 is a diagram of a ninth operation example.

FIG. 12 depicts an example in which a plurality of mobile station devices 100 (10 mobile station devices UE1 to UE10) operate with parameters determined in such a way that DCFC is 10 TTIs, USC is 10 TTIs, DSC is 10 TTIs, UAP is 5 TTIs, and DAP is 5 TTIs.

The mobile station devices UE1 and UE6 are arranged so as to enter Active Periods alternately as mobile station devices UE1 to UE5 and UE6 to UE10 are arranged to be shifted to each other at intervals of 1 TTI. As a result, a downlink CQI is transmitted at the head of a UAP without fail. In this case, uplink pilots transmitted from respective mobile station devices 100 can be multiplexed by employing Distributed FDMA or CDMA.

[Parameters for Improving Radio Quality]

Parameters of DCFC, USC, DSC, UAP and DAP are specified separately for the uplink and for the downlink, as shown in FIGS. 13(A) and 13(B).

When a large volume of data is handled in real-time service (e.g., video distribution service, TV phone, etc.), USC, DSC, UAP, DAP and DCFC are each determined to be 5 TTIs.

When a small volume of data is handled in real-time service (e.g., VoIP, etc.), USC, DSC and DCFC are each determined to be 10 TTIs while UAP and DAP are each determined to be 5 TTIs.

When a large volume of data is handled in nonreal-time service (e.g., FTP, etc.), USC, DSC and DCFC are each determined to be 20 TTIs while UAP and DAP are each determined to be 5 TTIs.

When a small volume of data is handled in nonreal-time service (e.g., chat, etc.), USC, DSC and DCFC are each determined to be 40 TTIs while UAP and DAP are each determined to be 5 TTIs.

As a result of the above setting, a certain volume of data can be transmitted in a certain period without fail in real-time service, and power consumption can be reduced as a scheduling area is secured for the mobile station device 100 handling a small volume of data.

Parameters are also applied in the following case.

If the mobile station device 100 with inferior radio quality transmits data in the same manner as the mobile station device 100 with better radio quality, an error occurs to waste resources.

For this reason, when radio propagation path quality is inferior (Low CQI), USC, DSC and DCFC are each determined to be 40 TTIs while UAP and DAP are each determined to be 5 TTIs.

While service types and radio environments are listed parallel to each other on Tables of FIG. 13, parameter setting corresponding to radio quality may be made for each service.

When Web browsing is carried out under the Internet connection environment, communication link needs to be kept connected even if data is not present. In such a case, that is, the case where communication link connection needs to be ensured despite of the absence of data (no packet), USC, DSC and DCFC are each determined to be 80 TTIs while UAP and DAP are each determined to be 5 TTIs.

The base station device 200 communicates the above parameters to the mobile station device 100 in a procedure of initial connection to the mobile station device 100. The mobile station device 100 communicates information for the base station device 200 to determine the parameters, to the base station device 200, or the mobile station device 100 determines the parameters to communicate the parameters to the base station device 200.

In executing real-time service (e.g., moving picture service, such as video distribution and TV phone, VoIP, etc.), a certain volume of data must be transmitted in a certain period without fail, so that data transmission priority must be raised.

In executing nonreal-time service handling randomly generated bursts of data, data transmission with low priority is allowable.

For this reason, data transmission priority is determined to be the first when a large volume of data is handled in real-time service, is determined to be the second when a small volume of data is handled in real-time service, is determined to be the third when a large volume of data is handled in nonreal-time service, and is determined to be the fourth when a small volume of data is handled in nonreal-time service. Independent of the above service contents, transmission with lower priority is carried out when a CQI is low, that is, the radio propagation environment is inferior. A transmission that exchanges no data and exchanges only the control information is given the lowest priority.

The above parameter setting is at least included in an RRC (Radio Resource Control) message that is issued when a radio bearer is set up, so that the parameters are set when each service is set up. A change in these parameters during communication is made by the use of the RRC message. For more frequent changes of parameter setting, the parameters may be controlled in TTIs by the use of a control signal on a physical layer or a MAC control signal.

To reduce the information volume of a control signal, the base station device 200 and the mobile station device 100 retain table as shown in FIG. 13 to exchange only the category numbers of the table. The category numbers of table may be exchanged in the form of 1-bit signal for stepping up or stepping down DSC and USC in TTIs. The base station device 200 and the mobile station device 100 may have a plurality of such parameters of table if the situation requires.

TENTH OPERATION EXAMPLE

When data traffic expected to accompany periodical flows of a volume of data presents together with data traffic involving dynamic flows of a volume of data, an effective method is carried out such that data traffic expected to accompany periodical flows of a volume of data is always transmitted at the head 1 TTI of UAP and of DAP, and that data traffic involving dynamic flows of a volume of data are scheduled fluidly using the remaining TTIs of the UAP and DAP.

Figure 14:
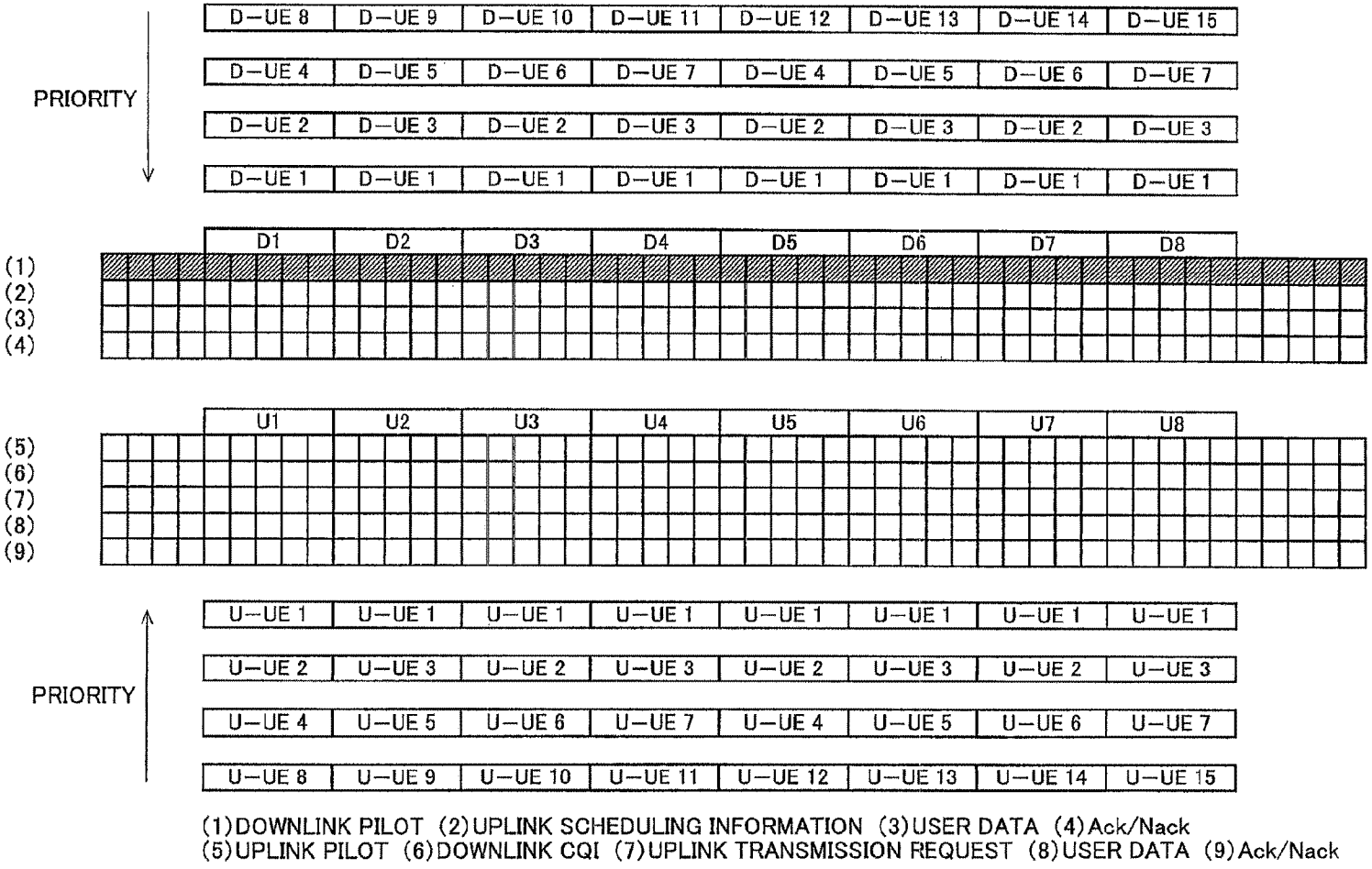
FIG. 14 is a diagram of a tenth operation example.

FIG. 14 depicts an example in which the parameters of FIG. 13 are assigned to mobile station devices (UE) 100.

In this case, for example, if scheduling is carried out in U1 period, mobile station devices 100 of UE1, UE2, UE6 and UE8 are to be scheduled. Accordingly, the mobile station device 100 of UE1 is scheduled first in highest priority, and the mobile station device 100 of UE2 is scheduled secondly. If an assignment area still remains, the mobile station devices UE6 and UE8 are then scheduled in order.

The mobile station devices may be arranged to be shifted to each other by 1 TTI and are assigned to assignment areas, as in the above case of FIG. 12.

ELEVENTH OPERATION EXAMPLE

Figure 15:
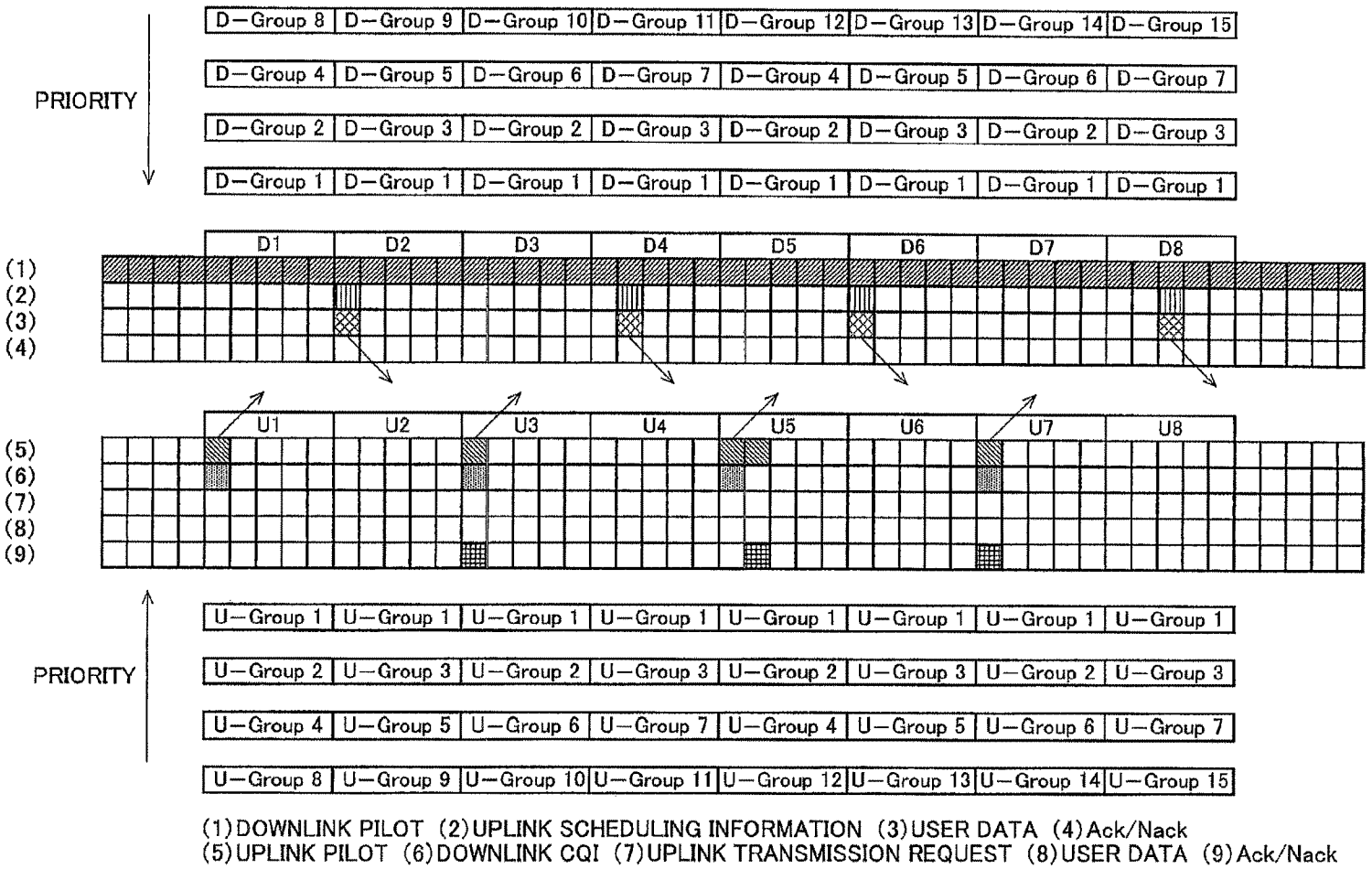
FIG. 15 is a diagram of an eleventh operation example.

In the above tenth operation example, the mobile station devices 100 of the parameter 1 and that of the parameter 2 becomes few in scheduling. FIG. 15 depicts an example in which the mobile stations devices 100 of the same parameter are grouped into a group and are scheduled.

The mobile stations devices 100 of the parameter 1 are grouped into one group of U-Group 1, the mobile stations devices of the parameter 2 are grouped into two groups of U-Group 2 and 3, the mobile stations devices of the parameter 3 are grouped into four groups of U-Group 4, 5, 6 and 7, and the mobile stations devices of the parameter 4 are grouped into eight groups of U-Group 8 to U-Group 15.

In this case, if scheduling is carried out in U1 period, mobile station devices 100 of U-Group 1, 2, 4 and 8 are to be scheduled. Accordingly, the mobile station device 100 of U-Group 1 is scheduled first in highest priority, and the mobile station device 100 of U-Group 2 is scheduled secondly. If an assignment area still remains, the mobile station devices of U-Group 4 and U-Group 8 are scheduled in order.

The above grouping enables scheduling of more mobile stations devices 100 on the uplink and the downlink.

Figure 16:
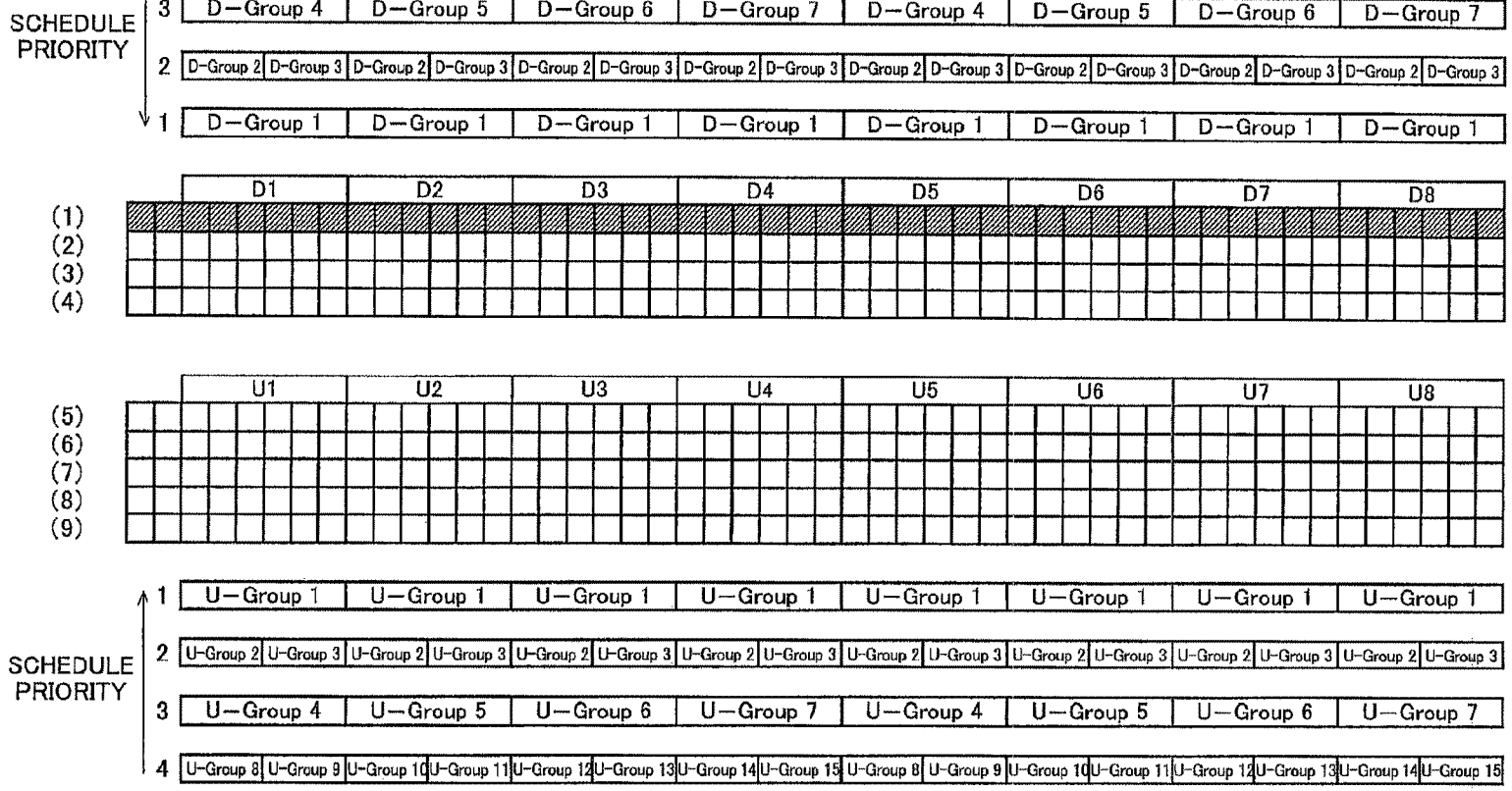
FIG. 16 is an example in which an Active Period is changed according to a service of the eleventh operation example.

Active Period may be changed depending on the type of service, as shown in FIG. 16.

TWELFTH OPERATION EXAMPLE

When radio propagation path quality is inferior, communication errors increase, thus assigned resources end up in waste.

When scheduling depending on a radio channel is carried out, inferior radio propagation path quality lowers a possibility of assigning radio resources or turns a downlink pilot reception process and an uplink pilot transmission process useless (i.e., power is wasted). In such a case, therefore, extending a transmission/reception suspension period results in less power consumption.

When radio propagation path quality becomes inferior, a hand-over process is carried out to change connection to a cell with better radio propagation path quality. Since connection is changed to a cell with better radio propagation path quality, the radio propagation path quality of a nearby cell needs to be measured in executing hand-over.

In measuring the radio propagation path quality of a nearby cell, the radio propagation path quality is measured after synchronizing with the downlink of a certain cell. This requires some time. Usually, the base station device 200 gives an instruction to measure the radio propagation path quality of another cell.

The following is a case where a transmission/reception suspension period is extended to measure radio propagation path quality of another cell in the transmission/reception suspension period when radio propagation path quality becomes inferior.

Figure 17:
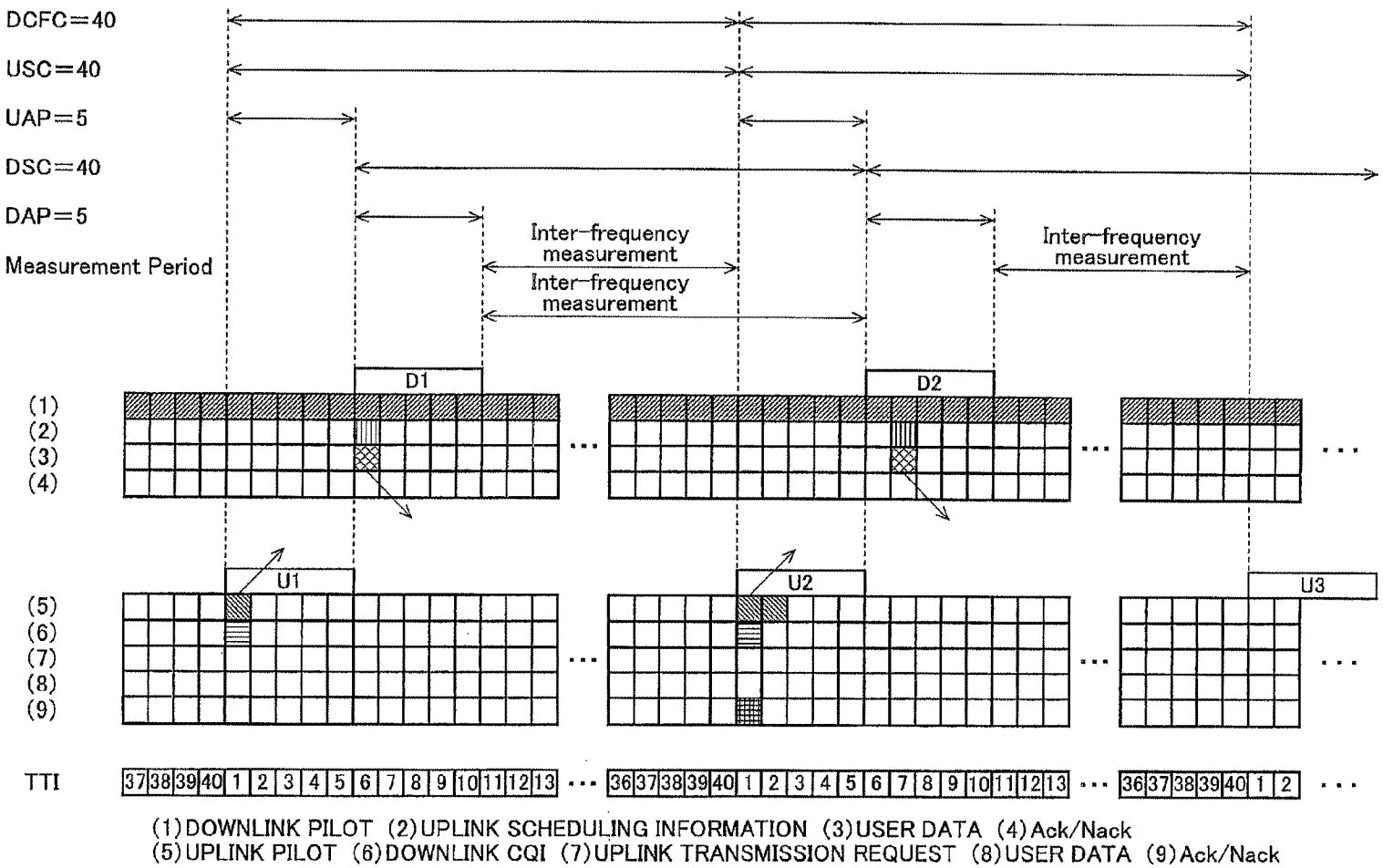
FIG. 17 is a diagram of a twelfth operation example.
Figure 18:
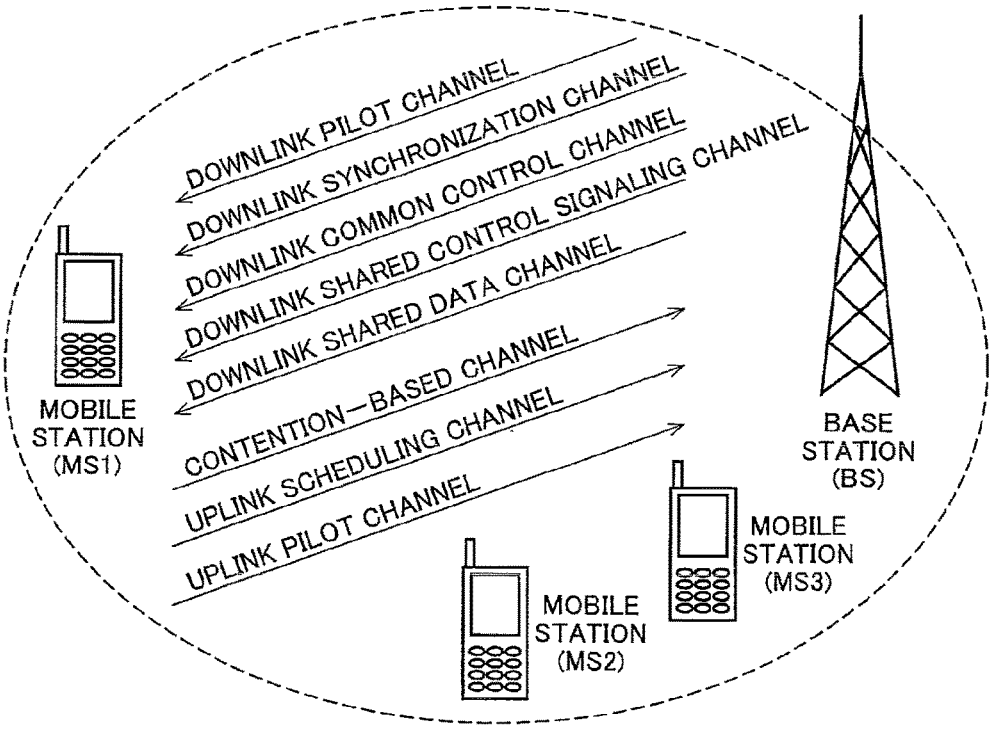
FIG. 18 is a diagram of a channel configuration of an uplink and a downlink that is assumed based on a suggestion from the 3GPP for EUTRA.
Figure 19:
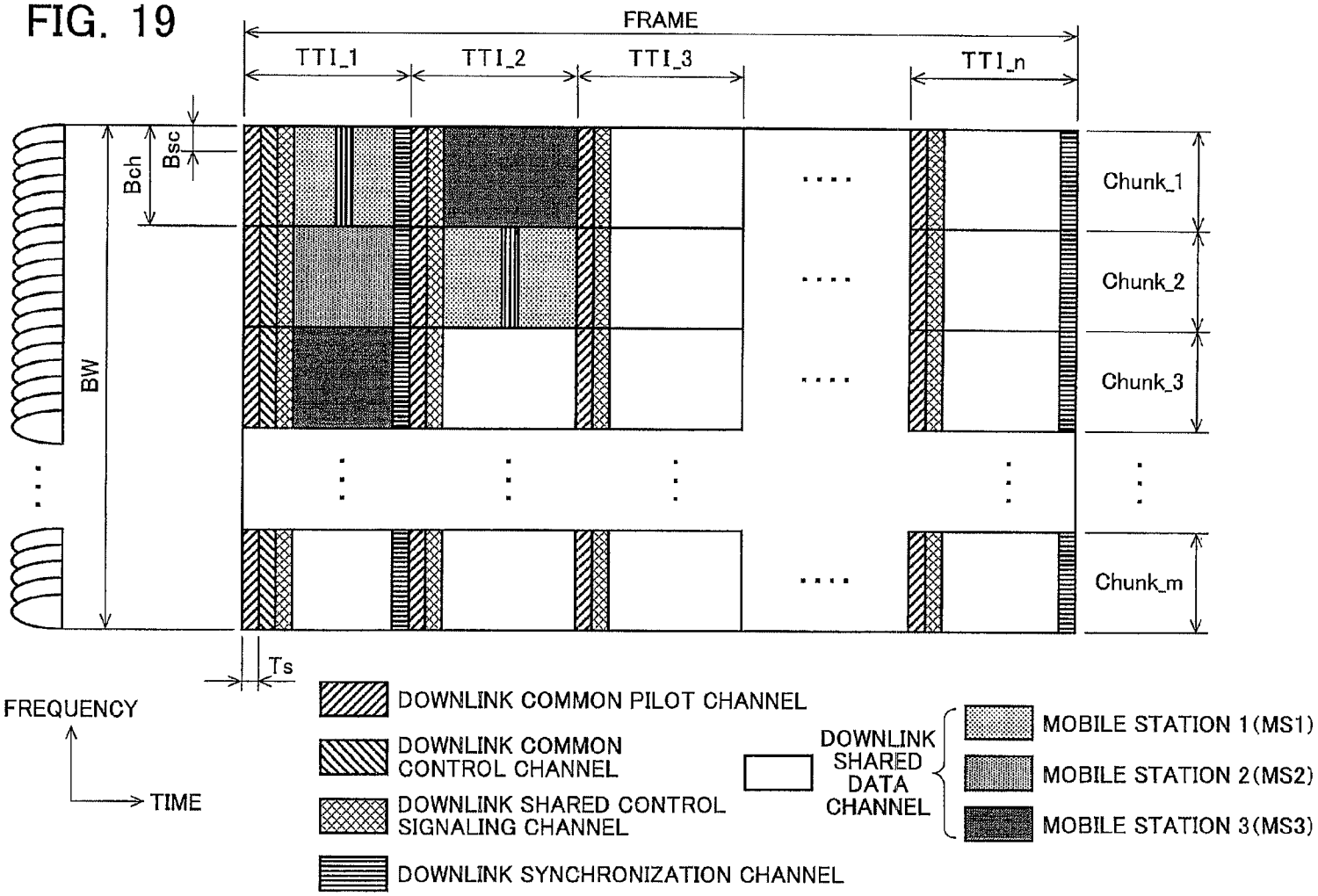
FIG. 19 is a diagram of a configuration of a downlink radio frame that is assumed based on a suggestion from the 3GPP for EUTRA.
Figure 20:
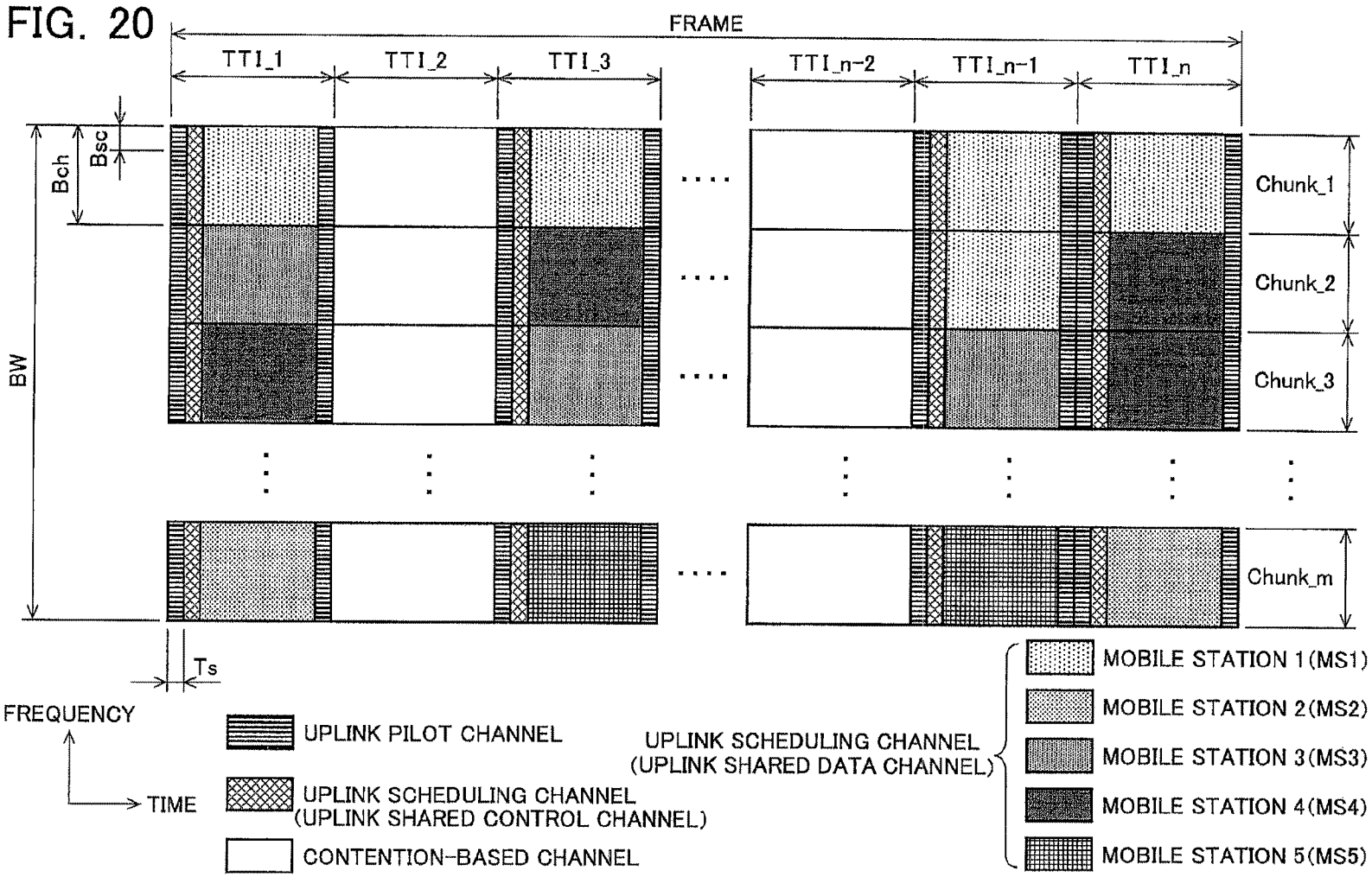
FIG. 20 is a diagram of a configuration of an uplink radio frame that is assumed based on a suggestion from the 3GPP for EUTRA.

In this case, DCFC is determined to be 40 TTIs, USC to be 40 TTIs, DSC to be 40 TTIs, UAP to be 5 TTIs, and DAP to be 5 TTIs (FIG. 17).

Usually, reception through the downlink is repeated in a TTI period of 6 to 10, and is suspended in TTI periods of 11 to 40 and 1 to 5. These reception suspension periods are used to measure the quality of a nearby cell.

In measuring the quality of a nearby cell, when the quality of a nearby cell having the same frequency is measured, the TTI periods of 11 to 40 and 1 to 5 are used to carry out measurement. When the quality of a nearby cell having a different frequency is measured, the quality of the cell using the different frequency is measured in the TTI period of 11 to 40 because transmission through the uplink is carried out in the TTI period of 1 to 5 in which frequency cannot change over to the different frequency to measure the quality.

The above process is expressed by the following equations.

Another cell measuring period (different frequency: Inter-frequency)=DSC-DAP-UAP Another cell measuring period (same frequency: Intra-frequency)=DSC-DAP Another cell measuring period using the same frequency may be identical with another cell measuring period using a different frequency.

The quality of another cell is measured in the above periods. When a need arises for the mobile station device 100 to measure the quality of another cell, the base station device 200 may change parameters to the parameters that enable the mobile station device 100 to measure the quality of another cell. The mobile station device 100 thus measures the quality of another cell in a range of given parameters.

In this manner, the base station device allows the mobile station device to measure the quality of another cell under ordinary scheduling without newly setting a period for measuring.

As described above, a transmission/reception suspension period is set on the uplink and on the downlink depending on service contents to allow a mobile station device to reduce power consumption, and a transmission/reception is controlled depending on service contents to allow a base station device to perform simple scheduling.

The invention claimed is:

[1. A radio communication system comprising:

a base station device; and a mobile station device, the base station device configured to:

communicate with the mobile station using a plurality of time slots of a frame, each slot being able to include at least a first part for a downlink control channel and a second part for a downlink shared data channel, variably set a periodic period during which the mobile station device is to be enabled to receive, in the first part in each slot, the downlink control channel containing radio resources scheduling information on radio resources for a downlink data channel in the same time slot in which the control channel is placed, variably set an interval between the start of the period and the start of a next period, and transmit the period and the interval together in a single RRC message to the mobile station device, and the mobile station device including a radio portion that receives the RRC message and a DRX control portion that sets the interval and the period of execution of a reception process on the downlink control channel containing radio resources scheduling information, based on the RRC message.]

[2. A base station device that communicates with a mobile station device using a plurality of slots, each slot being able to include at least a first part for a downlink control channel and a second part for a downlink shared data channel, the base station device comprising:

circuitry configured to:

variably set a periodic period during which the mobile station device is enabled to receive, in the first part in each slot, the downlink control channel containing radio resources scheduling information on radio resources for a downlink data channel in the same time slot in which the control channel is placed, variably set an interval between the start of the period and the start of a next period, and transmit the interval and the period together in a single RRC message to the mobile station device.]

[3. A mobile station device that communicates with a base station device using a plurality of slots, each slot being able to include at least a first part for a downlink control channel and a second part for a downlink shared data channel, the mobile station device comprising:

a radio portion that receives from the base station an RRC message containing a periodic period during which the mobile station device is enabled to receive, in the first part in each slot, the downlink control channel containing radio resources scheduling information on radio resources for a downlink data channel in the same time slot in which the control channel is placed from the base station device, and an interval between the start of the period and the start of a next period; and a DRX control portion that sets the interval and the period of execution of a reception process on the downlink control channel containing radio resources scheduling information, based on the RRC message, the period and the interval each being variably determined by the base station.]

*4. A mobile station device that communicates with a base station device using a plurality of time slots, the mobile station device comprising:*

*radio circuitry configured to receive from the base station device a radio resource control (RRC) message including a length of a time period during which the mobile station device is enabled to receive a downlink control channel and a time interval between the start of a time period and the start of a next time period,*

*wherein each time slot is able to include at least a downlink control channel and a downlink shared data channel, and*

*the downlink control channel carries radio resources scheduling information regarding radio resource for the downlink data channel in the same time slot where the downlink control channel is included; and*

*DRX control circuitry configured to set the time interval and the time period for a reception process on the downlink control channel, based on the RRC message, the time period and the time interval each being variably configured by the RRC message.*

*5. The mobile station device of claim 4, wherein the radio circuitry is further configured to transmit a downlink channel quality indicator (CQI) and a response to user data in a same time slot.*

*6. The mobile station device of claim 4, wherein the radio circuitry is further configured to transmit a downlink channel quality indicator (CQI) and an uplink scheduling request in a same time slot.*

*7. The mobile station device of claim 4, wherein the radio circuitry is further configured to transmit a downlink channel quality indicator (CQI) and an uplink pilot in a same time slot.*

*8. The mobile station device of claim 4, wherein the radio circuitry is further configured to transmit a downlink channel quality indicator (CQI) and uplink data in a same time slot.*

*9. A base station device that communicates with a mobile station device using a plurality of time slots, the base station device comprising:*

*radio circuitry configured to transmit to the mobile station device a radio resource control (RRC) message including a length of a time period during which the mobile station device is enabled to receive a downlink control channel and a time interval between the start of a time period and the start of a next time period,*

*wherein each time slot is able to include at least a downlink control channel and a downlink shared data channel, and*

*the downlink control channel carries radio resources scheduling information regarding radio resource for the downlink data channel in the same time slot where the downlink control channel is included; and*

*scheduling circuitry configured to set the time interval and the time period for a reception process on the downlink control channel on the mobile station device, based on the RRC message, the time period and the time interval each being variably configured by the RRC message.*

*10. The base station of claim 9, wherein the radio circuitry is further configured to receive a downlink channel quality indicator (CQI) and a response to user data from the mobile station device in a same time slot.*

*11. The base station of claim 9, wherein the radio circuitry is further configured to receive a downlink channel quality indicator (CQI) and an uplink scheduling request from the mobile station device in a same time slot.*

*12. The base station of claim 9, wherein the radio circuitry is further configured to receive a downlink channel quality indicator (CQI) and an uplink pilot from the mobile station device in a same time slot.*

*13. The base station of claim 9, wherein the radio circuitry is further configured to receive a downlink channel quality indicator (CQI) and uplink data from the mobile station device in a same time slot.*

*14. A method performed by a mobile station device that communicates with a base station device using a plurality of time slots, the method comprising;*

*receiving from the base station device a radio resource control (RRC) message including a length of a time period during which the mobile station device is enabled to receive a downlink control channel and a time interval between the start of a time period and the start of a next time period,*

*wherein each time slot is able to include at least a downlink control channel and a downlink shared data channel, and*

*the downlink control channel carries radio resources scheduling information regarding radio resource for the downlink data channel in the same time slot where the downlink control channel is included; and*

*setting the time interval and the time period for a reception process on the downlink control channel, based on the RRC message, the time period and the time interval each being variably configured by the RRC message.*

*15. The method of claim 14, further comprising: transmitting a downlink channel quality indicator (CQI) and a response to user data in a same time slot.*

*16. The method of claim 14, further comprising: transmitting a downlink channel quality indicator (CQI) and an uplink scheduling request in a same time slot.*

*17. The method of claim 14, further comprising: transmitting a downlink channel quality indicator (CQI) and an uplink pilot in a same time slot.*

*18. The method of claim 14, further comprising: transmitting a downlink channel quality indicator (CQI) and uplink data in a same time slot.*

*19. A method performed by a base station device that communicates with a mobile station device using a plurality of time slots, the method comprising:*

*transmitting to the mobile station device a radio resource control (RRC) message including a length of a time period during which the mobile station device is enabled to receive a downlink control channel and a time interval between the start of a time period and the start of a next time period,*

*wherein each time slot is able to include at least a downlink control channel and a downlink shared data channel, and*

*the downlink control channel carries radio resources scheduling information regarding radio resource for the downlink data channel in the same time slot where the downlink control channel is included; and*

*setting the time interval and the time period for a reception process on the downlink control channel on the mobile station device, based on the RRC message, the time period and the time interval each being variably configured by the RRC message.*

*20. The method of claim 19, further comprising: receiving a downlink channel quality indicator (CQI) and a response to user data from the mobile station device in a same time slot.*

*21. The method of claim 19, further comprising: receiving a downlink channel quality indicator (CQI) and an uplink scheduling request from the mobile station device in a same time slot.*

*22. The method of claim 19, further comprising: receiving a downlink channel quality indicator (CQI) and an uplink pilot from the mobile station device in a same time slot.*

*23. The method of claim 19, further comprising: receiving a downlink channel quality indicator (CQI) and uplink data from the mobile station device in a same time slot.*

* * * * *